US010674130B2

(12) United States Patent
Innami et al.

(10) Patent No.: US 10,674,130 B2
(45) Date of Patent: Jun. 2, 2020

(54) DYNAMICALLY CREATING VIDEO BASED ON STRUCTURED DOCUMENTS

(71) Applicant: International Business Machines Corporation, Armonk, NY (US)

(72) Inventors: Satoshi Innami, Tokyo (JP); Tadayuki Yoshida, Kawasaki (JP); Natsuki Zettsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 15/473,851

(22) Filed: Mar. 30, 2017

(65) Prior Publication Data

US 2017/0206930 A1    Jul. 20, 2017

Related U.S. Application Data

(63) Continuation of application No. 14/606,376, filed on Jan. 27, 2015, now Pat. No. 9,686,525.

(30) Foreign Application Priority Data

Jan. 30, 2014    (JP) .................. 2014-015360

(51) Int. Cl.
*H04N 9/87*    (2006.01)
*G11B 27/031*    (2006.01)
(Continued)

(52) U.S. Cl.
CPC ............. *H04N 9/87* (2013.01); *G11B 27/031* (2013.01); *G11B 27/34* (2013.01); *H04N 5/76* (2013.01)

(58) Field of Classification Search
USPC ................................ 386/239–248, 278–290
See application file for complete search history.

(56) References Cited

U.S. PATENT DOCUMENTS 7,613,993 B1    11/2009    Baer et al.
2006/0126735 A1 *    6/2006    Tanaka .................. H04N 19/172
375/240.12
(Continued)

FOREIGN PATENT DOCUMENTS

EP    1 087 619 A1 *    3/2001    ............. G11B 27/11
JP    07-036592    2/1995
(Continued)

OTHER PUBLICATIONS

List of IBM Patents and Patent Applications Treated as Related, Mar. 29, 2017. 2 pages.
(Continued)

*Primary Examiner* — Hung Q Dang
(74) *Attorney, Agent, or Firm* — Stosch Sabo

(57) ABSTRACT

An electronic system dynamically creates video based on a structured document by associating video clips with items in a structured document includes a server that is connected to a user terminal. The user terminal sends to the server, as a selected item, at least one item in a structured document selected by the user. The server receives the item sent by the user terminal, identifies the item in the structured document selected by the user, identifies at least one dependent item having a dependent relationship with the selected item, dynamically creates a video on the basis of at least one video clip associated with each identified item and at least one video clip associated with each identified dependent item, and sends the video for playback on the user terminal.

9 Claims, 31 Drawing Sheets

(51) Int. Cl.
*G11B 27/34* (2006.01)
*H04N 5/76* (2006.01)

(56) References Cited

U.S. PATENT DOCUMENTS

| | | | |
|---|---|---|---|
| 2007/0172194 A1* | 7/2007 | Suzuki | A63F 13/10 |
| | | | 386/241 |
| 2008/0256450 A1* | 10/2008 | Takakura | G06Q 10/109 |
| | | | 715/721 |
| 2009/0052872 A1* | 2/2009 | Chen | G11B 27/034 |
| | | | 386/343 |
| 2009/0156251 A1* | 6/2009 | Cannistraro | G08C 17/02 |
| | | | 455/557 |
| 2015/0213840 A1 | 7/2015 | Innami et al. | |
| 2016/0173960 A1* | 6/2016 | Snibbe | G06F 16/13 |
| | | | 386/285 |

FOREIGN PATENT DOCUMENTS

| | | |
|---|---|---|
| JP | 07-129348 | 5/1995 |
| JP | 08-123711 | 5/1996 |
| JP | 08-272572 | 10/1996 |
| JP | 09-101909 | 4/1997 |
| JP | 2005223744 A | 8/2005 |
| JP | 2006050469 A | 2/2006 |
| JP | 2012-128796 | 7/2012 |
| WO | 2009022703 A1 | 2/2009 |

OTHER PUBLICATIONS

Innami et al., "Method, Electronic Device, Electronic System and Electronic Device Program for Dynamically Creating Video Based on Structured Documents", JP Application No. 2014-015360. Filed Jan. 30, 2014.

* cited by examiner

341: 2-1, ..., 2-10, 3-3, 3-4, ..., 3-10, 4-1, ..., 5-1, ..., 6-1, ..., 6-6, 8-2, 8-3, ..., 8-10, 7-1, ..., 7-10, 9-1, 9-2, 9-3

351: 2-1, ..., 2-10, 3-3, 3-4, ..., 3-10, 4-1, ..., 5-1, ...
311
312a: 8-10, 7-1, ...
352
312b: 7-10, 9-1, 9-2, 9-3

351

| Step ID | Video Clip ID | Script ID |
|---|---|---|
| 1-1, 1-2, ..., 1-10 | ABCX | SHARP |
| 2-1, 2-2, 2-3, 2-4 | | FRMT |
| 2-5, 2-6 | | |
| 2-7, 2-8, 2-9, 2-10 | | EJMR |
| 3-1, 3-2, ..., 3-7 | TS6Y | |
| 3-8, 3-9, 3-10 | JSY7 | |
| 4-1, 4-2, ..., 4-10 | | W8E6 |
| 5-1, 5-2, 5-3, 5-4 | | RTEP |
| 5-5, 5-6, ..., 5-10 | | KDUS |
| 6-1, 6-2, ..., 6-5 | SQ78 | |
| 6-6, 6-7, ..., 6-10 | 9BR7 | |
| 7-1, 10-2, ..., 7-10 | AP4H | |
| 8-1, 8-2 | | KGB7 |
| 8-3, 8-4, ..., 8-7 | | BPOD |
| 8-8, 8-9, 8-10 | | NJY6 |
| 9-1, 9-2, ..., 9-10 | D8H4 | |
| 10-1, 10-2, ..., 10-10 | 7MPZ | |

362

| Step ID | Video Clip ID | Script ID |
|---|---|---|
| 1-1, 1-2, ..., 1-10 | https://example.com/clips/7988 | http://example.com/scripts/SHRP |
| 2-1, 2-2, 2-3, 2-4 | | http://example.com/scripts/FRMT |
| 2-5, 2-6 | | http://example.com/scripts/EJMR |
| 2-7, 2-8, 2-9, 2-10 | https://example.com/clips/T56Y | |
| 3-1, 3-2, ..., 3-7 | https://example.com/clips/JSY7 | |
| 3-8, 3-9, 3-10 | | |
| 4-1, 4-2, ..., 4-10 | | http://example.com/scripts/W8E6 |
| 5-1, 5-2, 5-3, 5-4 | | http://example.com/scripts/RTEP |
| 5-5, 5-6, ..., 5-10 | | |
| 6-1, 6-2, ..., 6-5 | | |
| 6-6, 6-7, ..., 6-10 | | |
| 7-1, 10-2, ..., 7-10 | https://example.com/clips/AP4H | http://example.com/scripts/KGB7 |
| 8-1, 8-2 | | http://example.com/scripts/BPOD |
| 8-3, 8-4, ..., 8-7 | | http://example.com/scripts/NJY6 |
| 8-8, 8-9, 8-10 | https://example.com/clips/D8H4 | |
| 9-1, 9-2, ..., 9-10 | https://example.com/clips/7MPZ | |
| 10-1, 10-2, ..., 10-10 | | |

DYNAMICALLY CREATING VIDEO BASED ON STRUCTURED DOCUMENTS

BACKGROUND

The present invention relates to a technique for dynamically creating video based on structured documents.

Electric manuals are being increasingly provided in place of paper manuals. Therefore, users are learning how to operate devices and software by viewing electronic manuals on screens.

However, when electronic manuals are presented in text form similar to paper manuals, it can be difficult for a user to learn how to operate a device or to actually operate the device using an electronic manual. When there is a discrepancy between information displayed on the screen of a device (such as on the display device of a computer) and the text in the electronic manual corresponding to the information, the user may not know where to look in the information displayed on the device and the learning may not stick.

When an electronic manual includes video, the user has to find the video at the spot that the user wants to view or learn more about, or fast forward to the spot that the user wants to view or learn more about.

Known prior art presents a device in which notes can be selected for display as guidance in accordance with user instructions entered by selecting functions. The device searches a guidance storage means for all of the notes corresponding to the selected functions, selects the notes to be displayed as guidance in accordance with user instructions from the notes in the search results, searches a guidance database for animation data corresponding to the selected notes, and displays animation based on the animation data in the search results.

Known prior art describes an interactive interface method which is able to realize an interactive interface between an operator and a machine. In this interactive interface method, the operation instruction procedure is changed from the machine to the operator based on the operator's degree of proficiency.

Known prior art describes a mobile communication device including: a storage unit for storing data entered by the user; a database unit storing the appropriate operating instructions; a guidance unit for matching data in the database unit to data entered into the storage unit, estimating the user's intention for performing an operation, and displaying the estimated operating procedure on a display means; a guidance information supplying unit for supplying operational guidance information to the guidance unit based on the operating procedure estimated by the guidance unit; and a determining unit for activating the guidance unit when data inputted by the user matches a predetermined reference value and it has been determined that activation of the guidance unit is required.

Known prior art describes a maintenance guidance information that is stored in an information processing device, and the maintenance guidance information is dynamically displayed on the screen of the display device when the device cover is opened. More appropriate maintenance guidance information can then be displayed in response to an instruction entered using an input device.

Known prior art describes a device that includes: an operation storage unit for storing a series of operations performed to recover from a malfunction; a display unit for displaying these operations; and a control unit for executing an operation displayed on the display unit on the basis of information entered using a mouse where the mouse is used to operate a malfunction recovery guidance function, and the operations stored in the storage unit are displayed on the display unit in a predetermined order.

SUMMARY

In an embodiment of the present invention, a method and/or computer program product dynamically creates video based on a structured document by associating video clips with items in a structured document. At least one item in the structured document selected by a user is identified, and at least one dependent item having a dependent relationship with each identified item is identified. A video is dynamically created based on at least one video clip associated with each identified item and at least one video clip associated with each identified dependent item. The video is then provided to a user.

In an embodiment of the present invention, an electronic system for dynamically creating video based on a structured document by associating video clips with items in a structured document includes a server that is connected to a user terminal. The user terminal sends to the server, as a selected item, at least one item in a structured document selected by the user. The server receives the item sent by the user terminal, identifies the item in the structured document selected by the user, identifies at least one dependent item having a dependent relationship with the selected item, dynamically creates a video on the basis of at least one video clip associated with each identified item and at least one video clip associated with each identified dependent item, and sends the video for playback on the user terminal.

BRIEF DESCRIPTION OF THE DRAWINGS

FIG. 3B shows an example of video clips associated with both user-specified items and dependent items being identified according to an embodiment of the present invention.

FIG. 6B shows an example of video clips associated with both user-specified items and dependent items being identified according to an embodiment of the present invention different from the embodiment shown in FIG. 3B.

FIG. 7B shows an example of video clips associated with both user-specified items and dependent items being identified according to an embodiment of the present invention different from the embodiment shown in FIG. 3B.

DETAILED DESCRIPTION

Figure 1A:
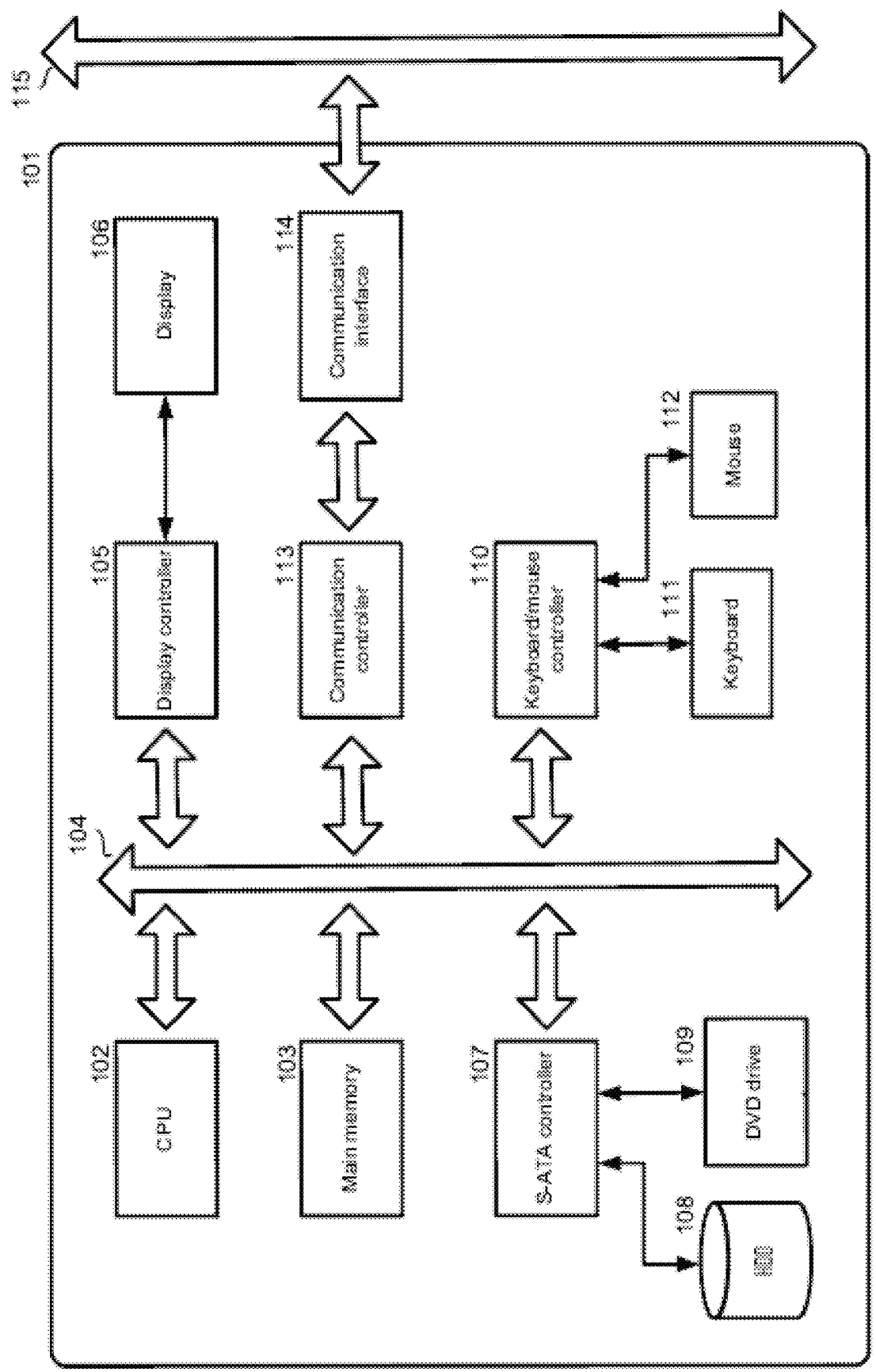
FIG. 1A is a diagram showing an example of an electronic device (a user terminal or a server) that can be used according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following is an explanation of an embodiment of the present invention with reference to the drawings. In the drawings described below, the same reference signs are used to denote the same elements unless otherwise noted. It should be understood that the embodiment of the present invention is used to explain a preferred embodiment of the present invention and that there is no intention to limit the scope of the present invention to the embodiment shown herein.

The following is an explanation of the terminology used in an embodiment of the present invention.

In an embodiment of the present invention, a "structured document" is an electronic document that can be rendered as a list of items. For example, a structured document may be realized as a tree structure. When a structured document is realized as a tree structure, each item is a node in the tree structure. Structured documents include XML and HTML documents. Other examples of structured documents include menu documents for playing back video (for example, playback menu documents on DVD disks, Blu-ray disks or hard disk recorders), electronic manuals, electronic instruction manuals, electronic operating manuals, electronic help documents, and electronic tutorial documents. Structured documents sometimes accompany products and services (on CD-ROMs or memory devices), are incorporated into products (on a memory device inside the product), or are downloaded via the internet or an intranet. The product may be a product for commercial sale or for use in-house. Examples include, but are not limited to, computer hardware and software, devices (IT devices and testing devices), home electronics, and educational materials. Services include, but are not limited to, real estate products (house and condominium sales), financial products, securities products, insurance products (life insurance, casualty insurance, earthquake insurance and fire insurance), travel products (such as planned travel), loan products (homeowner loans and car loans), ticketing products (movies, sports and the arts), educational products (language classes, training classes and seminars), and data products (such as personal data).

In an embodiment of the present invention "item" may be used as a table of contents feature. "Item" may refer to the table of contents, a header, a title or a step.

In an embodiment of the present invention, a "dependent item having a dependent relationship with an item" may be an item including an explanation or background information associated with an item selected by the user, or may be an item omitted from the explanation associated with an item selected by the user.

In an embodiment of the present invention, a "video" is composed of a plurality of video clips. Videos are dynamically created by the electronic device.

In an embodiment of the present invention, a "video clip" is the video data associated with each item. A video clip is video data prepared beforehand, such as a prerecorded video clip. In an embodiment of the present invention, a video clip may be video data obtained by an "operation script" run on a user terminal. An operation script is a group of instructions given to the user terminal. An operating script run on the user terminal can dynamically execute an operation to be performed by the user (for example, a mouse operation, keyboard operation or input operation) in a simulated way to show the user how to perform the operation. The user terminal may execute an operation script on a virtual execution screen separate from the screen currently being used by the user. The virtual execution screen may be an emulated screen, a simulated screen or a pseudo-execution screen. By running an operation script on the user terminal, a user can perform an on-the-spot verification of an actual operation to be performed on the user terminal. When the phrase "video clip" is used below, it should be understood to include video data obtained by running an operation script unless otherwise indicated.

In an embodiment of the present invention, "tracks" refer to step numbers selected by the user or inserted as a result of resolving dependent relationships with selected step numbers. Video clip IDs, script IDs and user-selected information associated with these step numbers (such as the clip categories "main step", "transitional step" or "supplemental step") are arranged in playback order using the step numbers. This data is analogous to the screenplay of a movie.

In the present embodiment, "electronic device" may refer to a server able to receive items selected by a user using a user terminal or may refer to a user terminal including a structured document.

In an embodiment of the present invention, the user terminal is not restricted to a particular web browser application or application used to display the help function. Examples of web browsers that can be used include Internet Explorer (registered trademark) (IE), Google Chrome (registered trademark), Safari (registered trademark), and Firefox (registered trademark). The electronic device may be a personal computer such as a desktop computer or notebook computer, an internet television, a gaming console, a tablet, a smartphone (such as the tablet or smartphone in which Windows (registered trademark), Android (trademark) or iOS (trademark) may be installed), or any other type of device.

Figure 1B:
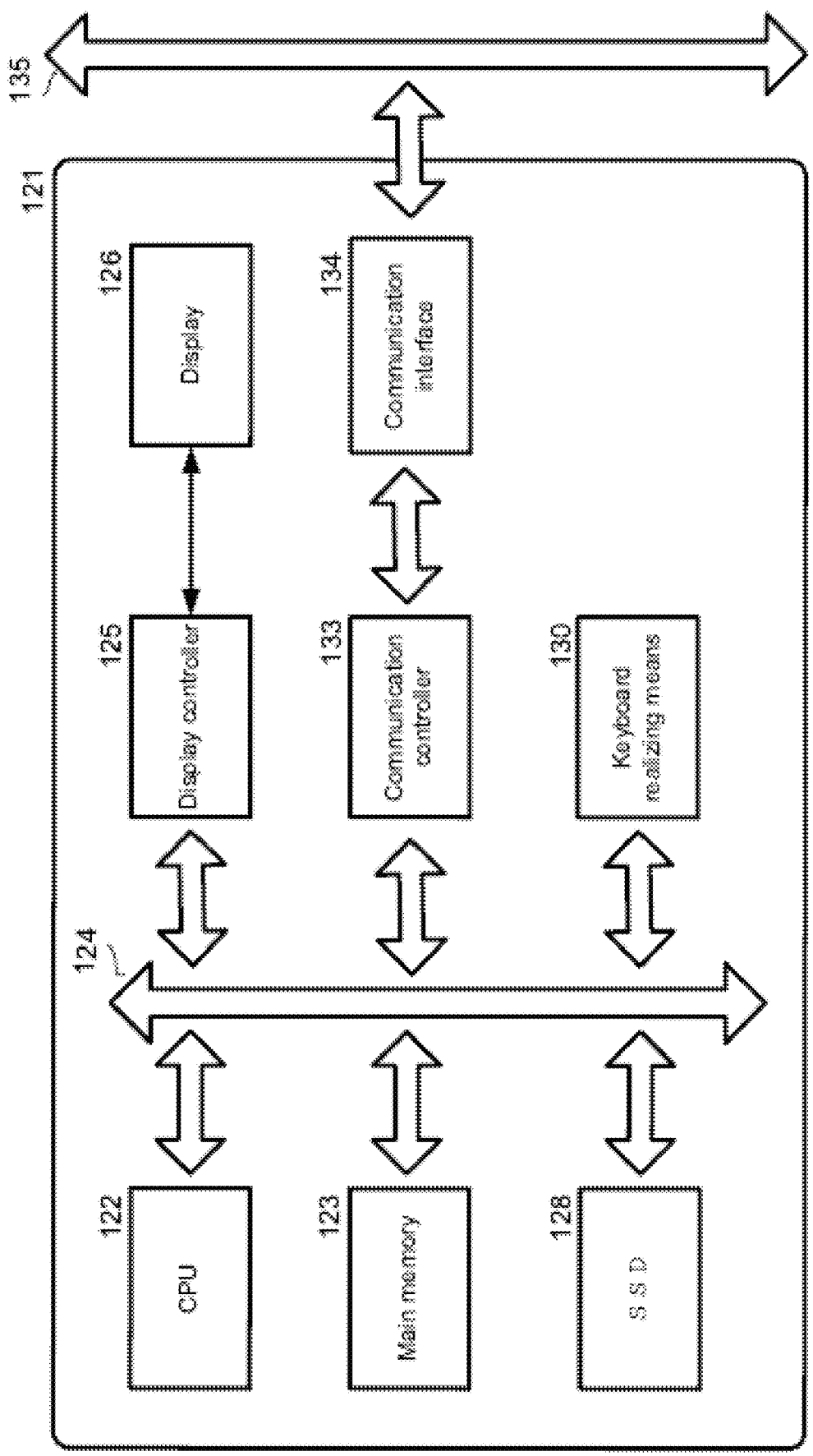
FIG. 1B is a diagram showing an example of a user terminal that can be used according to an embodiment of the present invention.

FIG. 1A and FIG. 1B are diagrams showing an example of hardware (electronic device, user terminal) used in an embodiment of the present invention.

FIG. 1A is a diagram showing an example of a device (server or user terminal) used in an embodiment of the present invention.

This electronic device (101) includes a central processing unit (CPU) (102) and a main memory (103), and these are connected to a bus (104). The CPU (102) is preferably based on a 32-bit or 64-bit architecture. Examples that can be used include the Core i (trademark) series, Core 2 (trademark) series, Atom (trademark) series, Xeon (registered trademark) series, Pentium (registered trademark) series or Celeron (registered trademark) series from Intel Corporation, the A (trademark) series, Phenom (trademark) series, Athlon (trademark) series, Turion (registered trademark) series or the Sempron (trademark) series from Advanced Micro Devices, and the Power (trademark) series from International Business Machines Incorporated.

A display (106) such as a liquid crystal display (LCD) may be connected to the bus (104) via a display controller (105). The display (106) may be used to display objects via a suitable graphic interface by running software on the electronic device (101) (for example, the electronic device program in an embodiment of the present invention or any other electronic device program run on the electronic device (101) such as any other type of computer program). The display (106) may output screens from a web browser application.

A disk (108) such as a hard disk or solid state drive (SSD) may be optionally connected to the bus (104) via an S-ATA or IDE controller (107).

A drive (109) such as a CD, DVD or BD drive may be optionally connected to the bus (104) via a SATA or IDE controller (107).

A keyboard (111) and mouse (112) may be optionally connected to the bus (104) via a peripheral device controller (110) such as a keyboard/mouse controller or USB bus.

An operating system such as Windows (registered trademark), UNIX (registered trademark), MacOS (registered trademark), a Java (registered trademark) processing environment such as J2EE, Java (registered trademark) applications, Java (registered trademark) virtual machines (VM), and Java (registered trademark) just-in-time (JIT) compilers, the electronic device program according to the embodiment of the present invention, as well as other electronic device programs and data, may be stored for loading into the main memory (103).

The display (108) may be built into the electronic device (101), connected via a cable so as to be accessible by the electronic device (101), or connected via a wired or wireless network so as to be accessible by the electronic device (101).

If necessary, a drive (109) may be used to install a program such as an operating system, application or an electronic device program according to an embodiment of the present embodiment on the disk (108) from a CD-ROM, DVD-ROM or BD.

The communication interface (114) may run according to the Ethernet (registered trademark) protocol. The communication interface (114) is connected to a bus (104) via a communication controller (113), and functions to physically connect the electronic device (101) to the communication network (115) via wires or wirelessly. This provides a network interface layer for the TCP/IP communication protocol in the communication function of the operating system of the electronic device (101). The communication line can operate in a wireless LAN environment or a Wi-Fi wireless LAN environment according to wireless LAN connection standards such as IEEE 802.11a/b/g/n, or a mobile phone network environment (such as a 3G or 4G environment).

FIG. 1B is a diagram showing an example of a user terminal that may be used in an embodiment of the present invention.

In the electronic device (121) shown in FIG. 1B, the CPU (122), main memory (123), bus (124), display controller (125), display (126), SSD (128), communication controller (133), communication interface (134) and communication network (135) correspond to the CPU (102), main memory (103), bus (104), display controller (105), display (106), SSD (108), communication controller (113), communication interface (114) and communication network (115) in the electronic device (101) shown in FIG. 1A.

When the electronic device (121) is a smartphone, mobile phone or tablet, the CPU (122) may be any CPU commonly used in a smartphone, mobile phone or tablet, or the A Series (registered trademark) from Apple, Inc.

The smartphone OS (such as the Android OS (registered trademark), the Windows Phone OS (registered trademark), Windows (registered trademark) or iOS), the application program according to an embodiment of the present invention, other programs, and data may be stored on the SSD (128) disk for loading into the main memory (123).

The keyboard realizing means (130) may be an application for displaying a software keyboard on the display (126).

FIG. 2A through FIG. 2D, FIG. 3A through FIG. 3C, FIG. 4A through FIG. 4D, FIG. 5A through FIG. 5B, FIG. 6A through FIG. 6C, FIG. 7A through FIG. 7C and FIG. 8 show the series of operations performed in accordance with an embodiment of the present invention to dynamically create video on the basis of a structured document: identifying at least one item in the structured document selected by the user (FIG. 2A through FIG. 2B and FIG. 2C through FIG. 2D); identifying at least one item having a dependent relationship with the identified item (FIG. 3A, FIG. 6A and FIG. 7A); selecting video clips associated with the identified items and creating a video (FIG. 3B, FIG. 6B, FIG. 6C, FIG. 7B and FIG. 7C); categorizing each video clip in the created video (FIG. 3C, FIG. 6C and FIG. 7C); and performing processing to play back the created video (FIG. 4A through FIG. 4B, FIG. 5A through FIG. 5B, FIG. 6C and FIG. 7C). FIG. 5C shows the operations performed to play back the video created in accordance with an embodiment of the present invention (FIG. 5C).

FIG. 2A through FIG. 2B and FIG. 2C through FIG. 2D show an example of a user interface in an embodiment of the present invention which allows the user to select one or more specific items in an electronic manual.

Figure 2A:
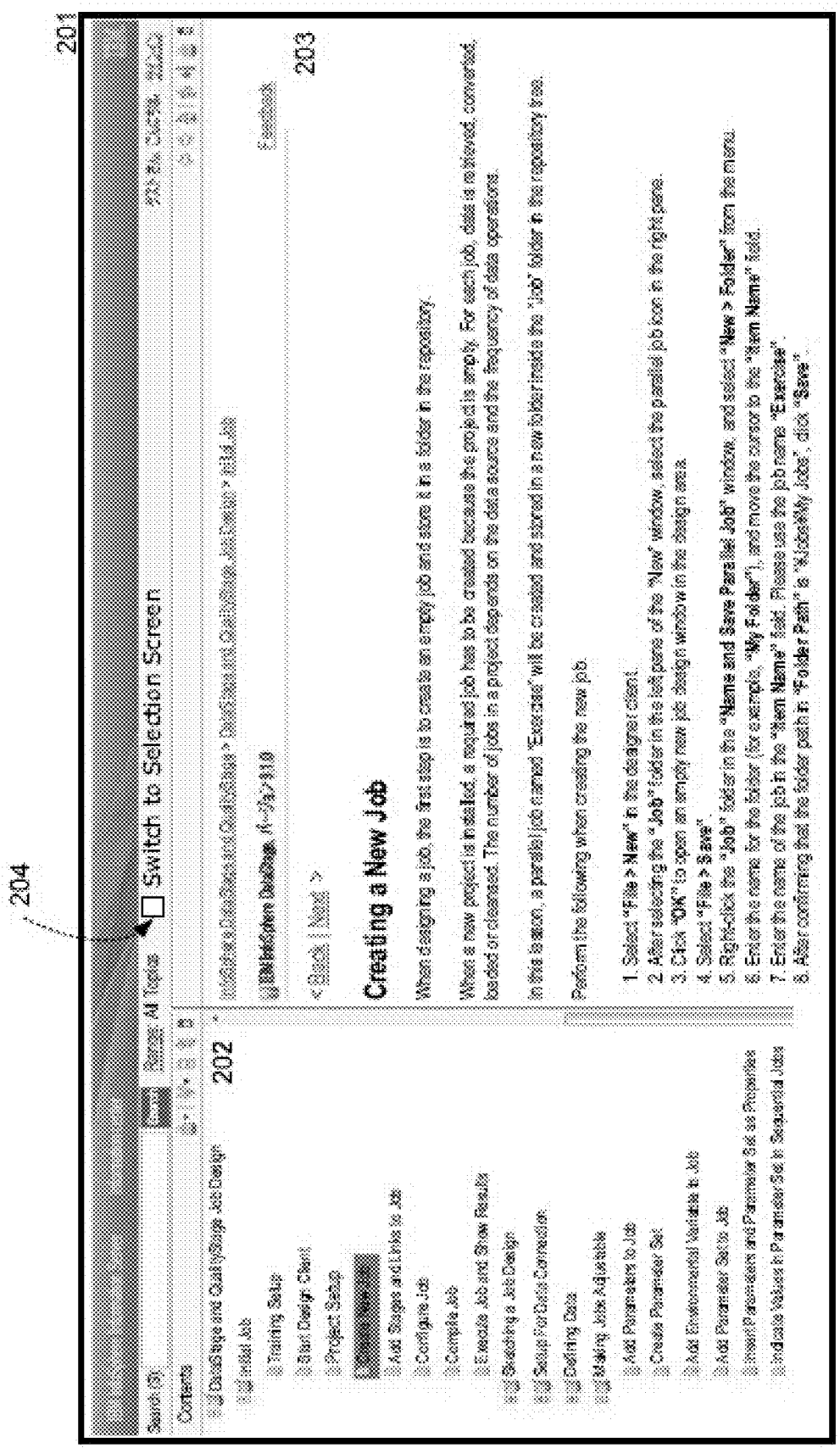
FIG. 2A shows an example of a user interface enabling a user to select one or more particular items in an electronic manual.
Figure 2B:
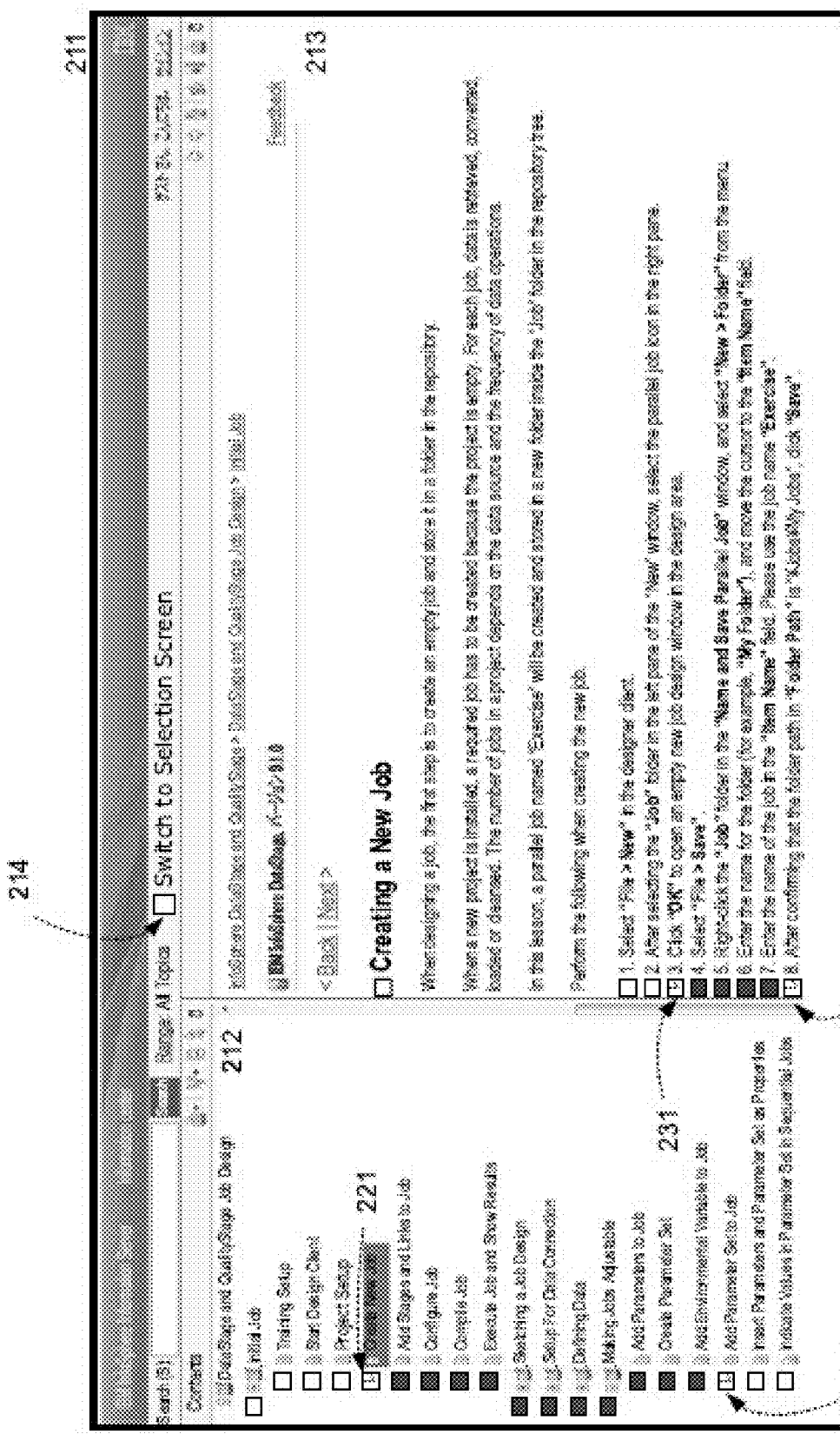
FIG. 2B shows an example of a user interface enabling a user to select one or more particular items in an electronic manual.

FIG. 2A through FIG. 2B show an example of a user interface in an embodiment of the present invention which allows the user to select one or more specific items in an online electronic manual for a software application.

The screen (201) shown in FIG. 2A is an online manual screen for a software application that is being displayed on the display device of a user terminal. The user views the online manual on the screen (201). The user interface for the online manual includes a table of contents pane displaying the table of contents, and an explanation displaying pane (203) for displaying the explanation of each item in the table of contents. The online manual screen (201) includes a "switch to selection screen" button (204) which allows the user to switch to the selection screen in order to select one or more items in the online manual. Alternatively, the online manual screen (201) may display a keyboard shortcut that can be activated by pressing a specific key on the keyboard to switch to the selection screen and allow the user to select one or more items in the online manual (for example, "Press F9 to switch to the selection screen"). The user may also switch to the selection screen to select one or more items in the online manual by performing a certain gesture. Possible gestures include: (1) sliding one or more fingers from the left or right side of the screen or a track pad towards the center; (2) tracing a circle on the screen or track pad using one or more fingers; or (3) moving one or more fingers on both the left and right hands in opposite directions vertically or horizontally on the screen or track pad (for example, moving two fingers on the right hand upwards and two fingers on the left hand downwards).

In this example, the user wishes to switch to the selection screen in order to select one or more items in the online manual. The user clicks the "switch to the selection screen" button (204). The user may also select and click on "switch to selection mode" instruction in the menu. The user may alternatively perform a certain action to switch to the selection screen, such as pressing a specific key on the keyboard or perform a certain gesture on the user terminal. The user terminal displays the selection screen (211) shown in FIG. 2B on the display device of the user terminal in response to the user pressing the "switch to the selection screen" button (204) (or clicking on "switch to selection mode" or performing a certain action.

The selection screen (211) shown in FIG. 2B includes a table of contents pane (212) for the table of contents screen (202), and an explanation display pane (213) for the explanation display screen (203). Each item in the table of contents pane (212) has a button (or check box denoted by ☐) enabling the item to be selected. Each item in the explanation display pane (213) also has a button (or check box denoted by ☐) enabling the item to be selected. The selection screen (211) also includes a button for returning to the online manual screen (201) (that is, a "switch to normal screen" button (214) for switching to the "normal mode"). Alternatively, the selection screen (211) may display a keyboard shortcut that can be activated by pressing a specific key on the keyboard to switch to the online manual screen (201) (for example, "Press F9 to switch to the normal screen"), or the user may perform a certain gesture to switch to the online manual screen (201). This gesture may be any one of gestures (1) through (3) described above.

Alternatively, there may be neither a "normal mode" nor a "selection mode". Instead, the button for selecting items may be displayed on the screen to the left of the items so that the user can click on the text of the item to move to the page associated with the text of the clicked item (corresponding to the "normal mode" described above), or can click on the button to create a video associated with the item (corresponding to the "selection mode" described above).

When the user has selected all of the items (in the table of contents) in the table of contents pane (212) that the user wishes to view or has an interest in (referred to as a "batch selection" below), the user may click on the first item (referred to as the "item in the start position" below) (221) (for example, turning on the check box) while holding down a specific key (such as the Ctrl key). Next, the user may click on the last item (referred to as the "item in the end position" below) (222) (for example, turning on the check box) that the user wishes to view or has an interest in while holding down a specific key (such as the Ctrl key). In response to the item in the start position (221) and the item in the end position (222) being clicked while a specific key was being held down (such as the Ctrl key), the user terminal may dynamically select all of the items between the item in the start position (221) and the item in the end position (222), and displays the check boxes of the dynamically selected items in an intermediate state between on and off. Next, the user may again use the table of contents pane (212) to select an item in the start position and an item in the end position different from the item in the start position (221) and the item in the end position (222) selected earlier. The user may also click on a single item (or turn on a check box) without holding down a specific key to individually select an item that the user wishes to view or has an interest in (referred to as "individual selection" below).

Also, when the user has selected all of the items in the explanation display pane (213) that the user wishes to view or has an interest in (that is, has performed a "batch selection"), the user may click on the first item (the "item in the start position") (231) (for example, turning on the check box) while holding down a specific key (such as the Ctrl key). Next, the user may click on the last item (the "item in the end position") (232) (for example, turning on the check box) that the user wishes to view or has an interest in while holding down a specific key (such as the Ctrl key). In response to the item in the start position (231) and the item in the end position (232) being clicked while a specific key was being held down (such as the Ctrl key), the user terminal may dynamically select all of the items between the item in the start position (231) and the item in the end position (232), and displays the check boxes of the dynamically selected items in an intermediate state between on and off. Next, the user may again use the explanation display pane (213) to select an item in the start position and an item in the end position different from the item in the start position (231) and the item in the end position (232) selected earlier. The user may also click on a single item (or turn on a check box) in the explanation display pane (213) without holding down a specific key to individually select an item (for example, the table of contents) that the user wishes to view or has an interest in (that is, perform an "individual selection").

In response to the user selecting items combined with the item in the start position and the item in the end position, the user terminal may identify the items in the online manual selected by the user.

Instead of selecting a combination of items including an item in the start position and an item in the end position, the user may select a single item (such as a chapter title in the table contents or a title referring to all of the tasks) (for example, by turning on the check box for a large item) (not shown). Examples of chapter titles in the table of contents pane (212) shown in FIG. 2B include "Initial Job", "Sketching a Job Design", "Setup for Data Connection", "Defining Data" and "Making Jobs Adjustable". An example of a level showing all of the individual tasks is "Creating a New Job" shown in the explanation display pane (213) shown in FIG. 2B.

The user terminal may respond to the user selecting a large item such as an entire chapter or an entire section by identifying the item selected by the user in the online manual.

Figure 2C:
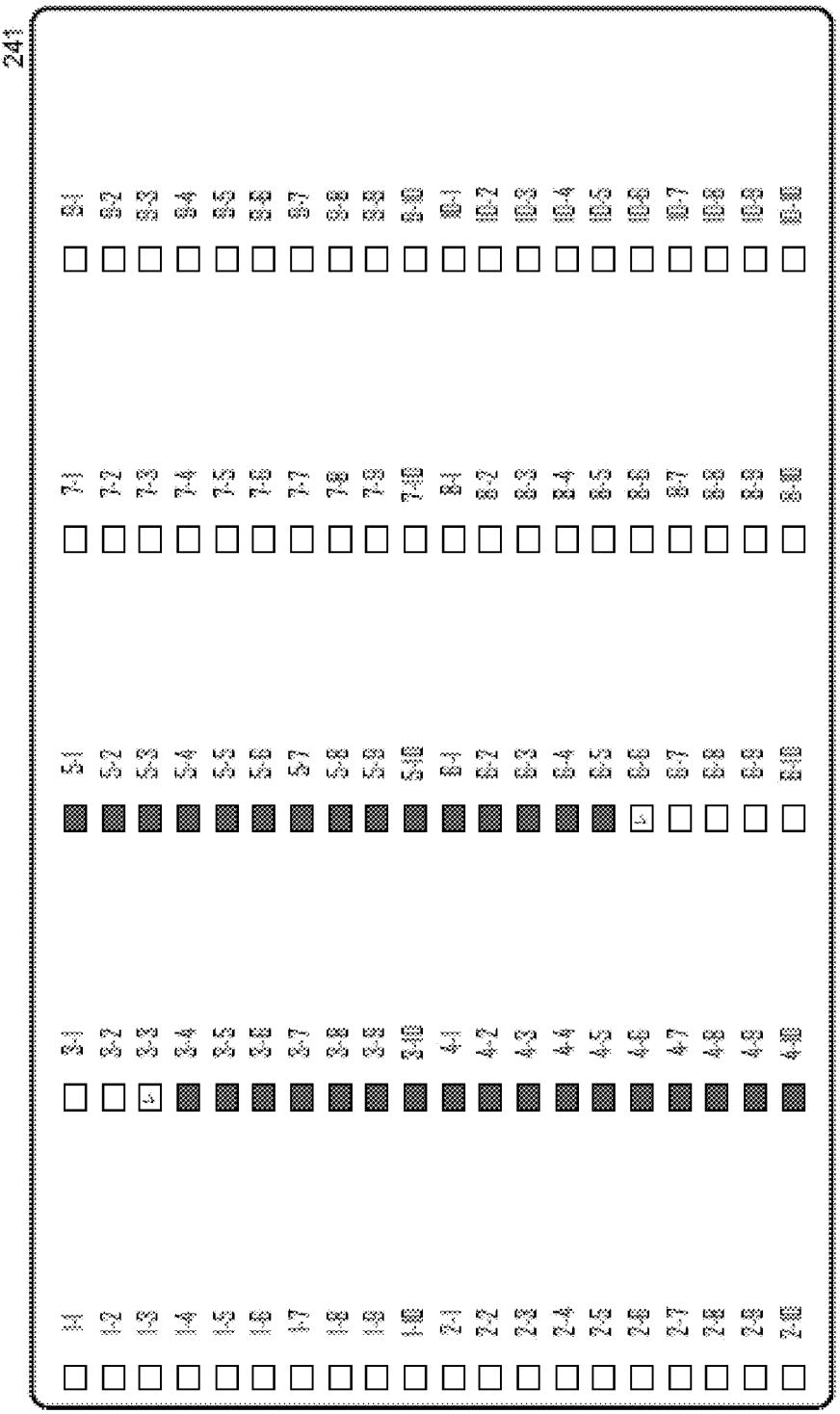
FIG. 2C shows an example of a user interface enabling a user to select one or more particular items in an electronic manual.
Figure 2D:
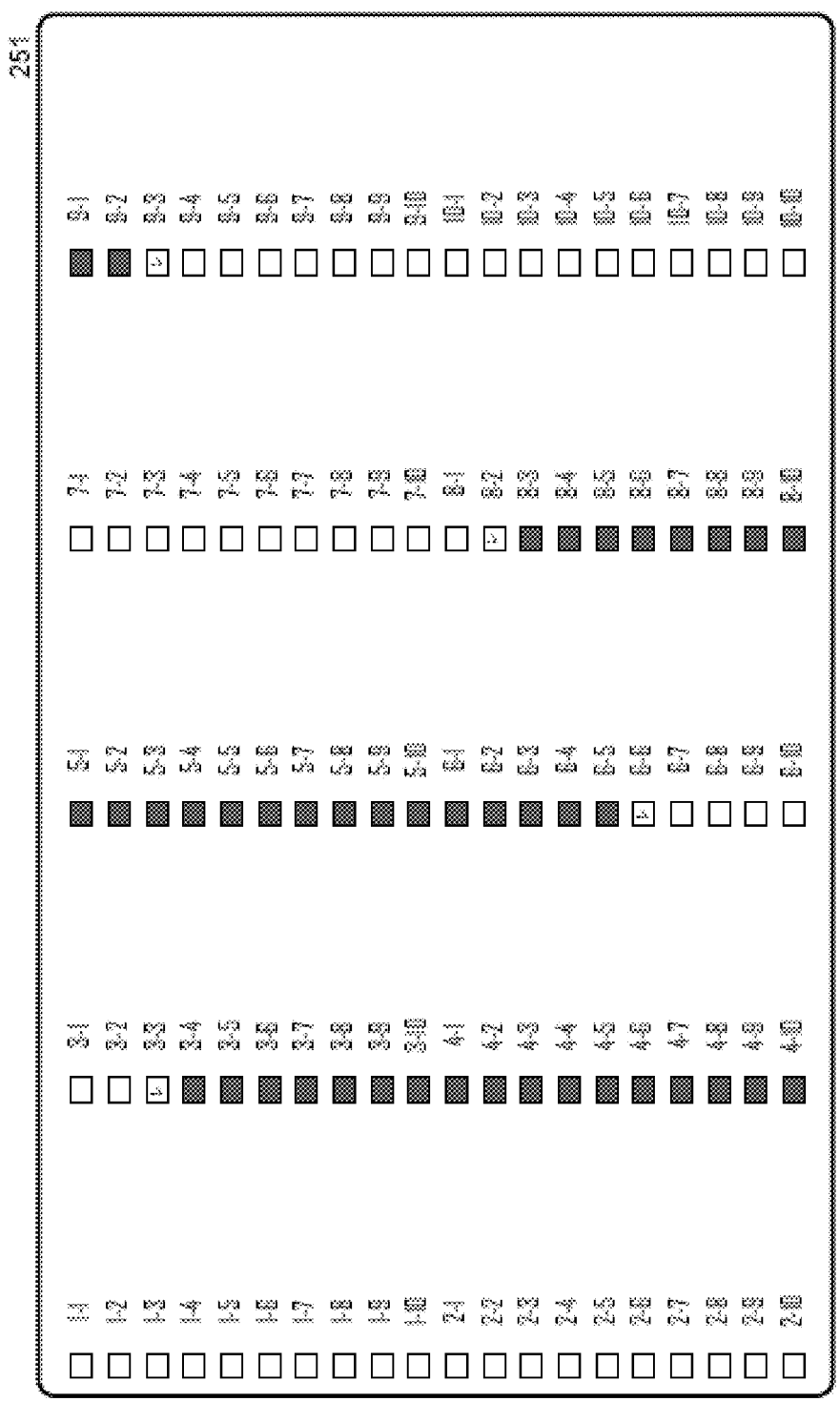
FIG. 2D shows an example of a user interface enabling a user to select one or more particular items in an electronic manual.

FIG. 2C through FIG. 2D show an example of a user interface in an embodiment of the present invention which allows the user to select one or more items in an electronic manual.

The screens (241, 251) shown in FIG. 2C and FIG. 2D are screens showing all of the steps in an electronic manual for software. There are 100 steps ranging from Step 1-1 to Step 10-10. Each step is assigned a number. The title of each step has been omitted from the screens (241, 251).

First, the user clicks the check box of the first step in the electronic manual in which the user is interested (Step 3-3) and then clicks the check box of the final step in which the user is interested (Step 6-6). In response to the user clicking on Step 3-3 and Step 6-6, the electronic device dynamically selects all of the items between Step 3-3 and Step 6-6 (Step 3-4 through Step 6-5), and displays the check boxes of the dynamically selected items in an intermediate state between on and off (see screen (241)). The electronic device then identifies Step 3-3 through Step 6-6 as items selected by the user.

Next, the user clicks on the last step in the electronic item in which the user is interested (Step 9-3) and then clicks on the first step in which the user is interested (Step 8-2). In response to the user clicking on Step 9-3 and Step 8-2, the electronic device dynamically selects all of the items between Step 8-2 and Step 9-3 (Step 8-3 through Step 9-2) because this is the sequence of numbers between the step number of the first step clicked on and the step number of the last step clicked on. The check boxes of the dynamically selected items are displayed in an intermediate state between on and off (see screen (251)). The electronic device identifies Step 8-2 through Step 9-3 as items selected by the user.

The screens (241, 251) in FIG. 2C and FIG. 2D show all of the steps in the electronic manual. Alternatively, the user terminal may display some of the steps on the screen (in the window), and display the remaining steps as the user scrolls down the screen using a scroll bar.

Figure 3A:
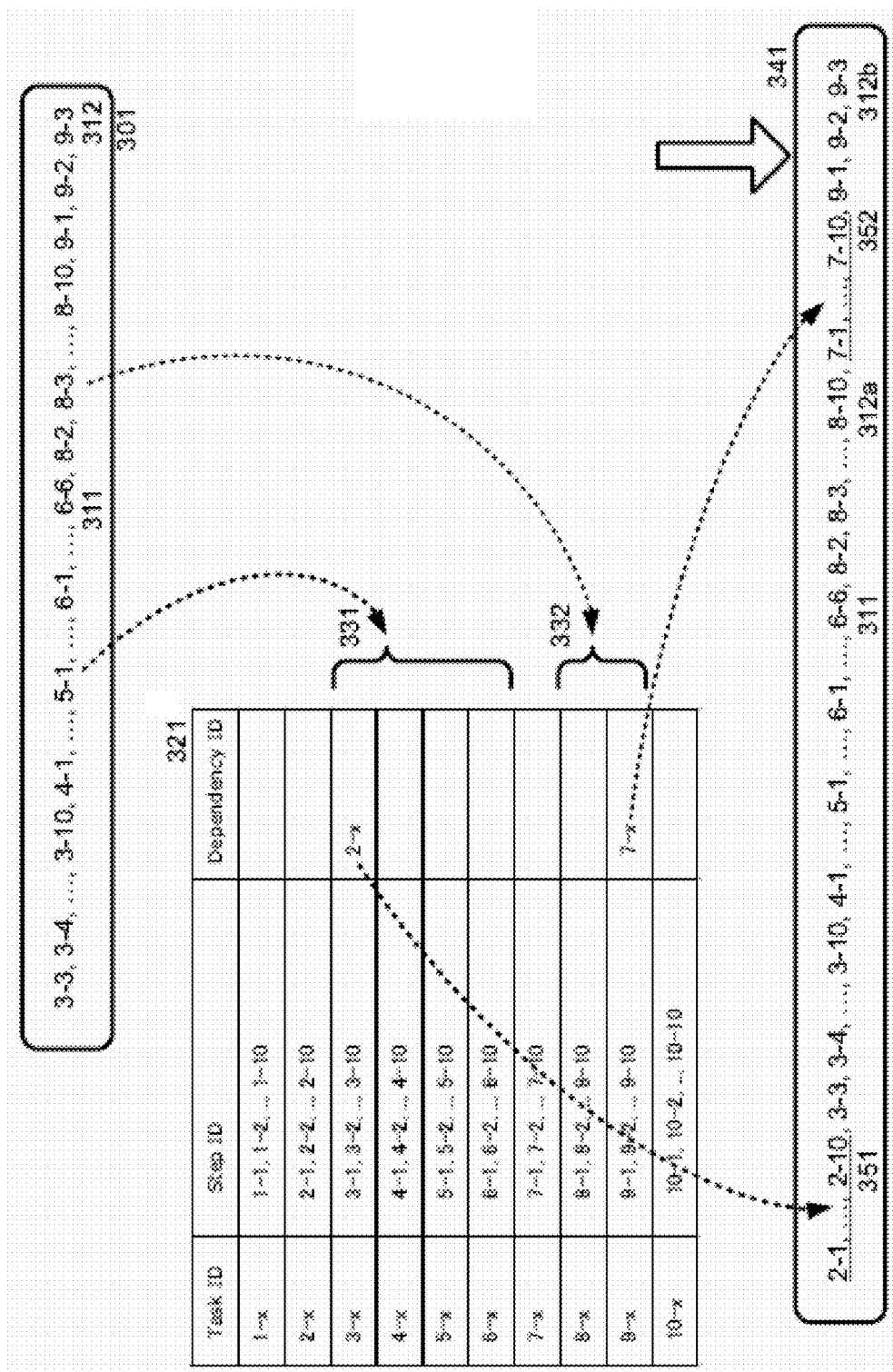
FIG. 3A shows an example of a dependent item having a dependent relationship with a user-specified item being identified according to an embodiment of the present invention.

FIG. 3A is an example showing how dependent items having a dependent relationship with user-selected items are identified in an embodiment of the present invention.

The step ID list (301) shown in FIG. 3A links each item selected by the user in FIG. 2C through FIG. 2D, that is, Steps 3-3 through Step 6-6 (311) and Step 8-2 through Step 9-3 (312).

The electronic device may identify any dependent item having a dependent relationship with the items in the step ID list (301) using the dependent item identifying table (321) which lists items and dependent items having a dependent relationship with those items. The dependent item identifying table (321) may include task IDs (which are IDs associated with items and are IDs ranked higher than step IDs), step IDs associated with task IDs (which are IDs associated with items), and dependency IDs (which are IDs associated with dependent items having a dependent relationship with items having step IDs). The dependent item identifying table (321) shows that the steps with step IDs 3-3 through 3-10 have a dependency relationship with step IDs 2-*x* (that is, Step 2-1 through Step 2-10). Similarly, the dependent item identifying table (321) shows that the steps with step IDs 9-1 through 9-10 have a dependency relationship with step IDs 7-*x* (that is, Step 7-1 through Step 7-10). The dependent item identifying table (321) may assume the format of a table or any other data format as long as the IDs are associated with dependency IDs.

The electronic device uses the dependent item identifying table (321) to determine that, among Step 3-3 through Step 6-6 (311), Step 3-3 through Step 3-10 have dependency relationships with Steps 2-*x* (that is, Step 2-1 through Step 2-10) (331).

Similarly, the electronic device uses the dependent item identifying table (321) to determine that, among Step 8-2 through Step 9-3 (312), Step 9-1 through Step 9-3 have dependency relationships with Steps 7-*x* (that is, Step 7-1 through Step 7-10) (332).

Figure 9A:
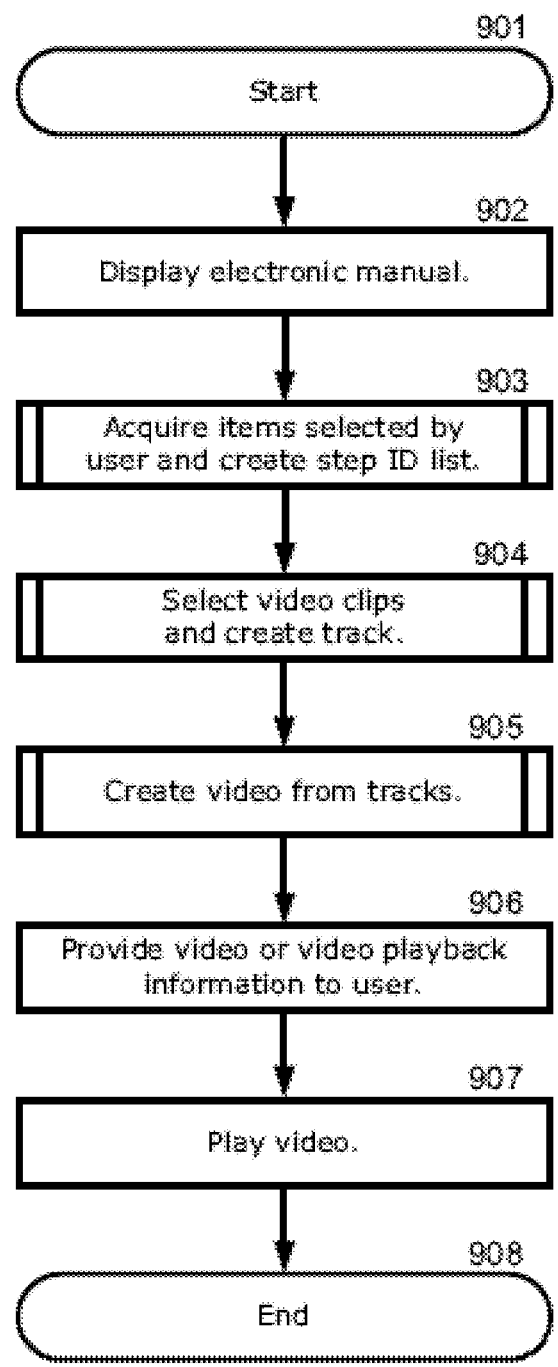
FIG. 9A is a general flowchart of the process of dynamically creating videos on the basis of a structured document according to an embodiment of the present invention.
Figure 9B:
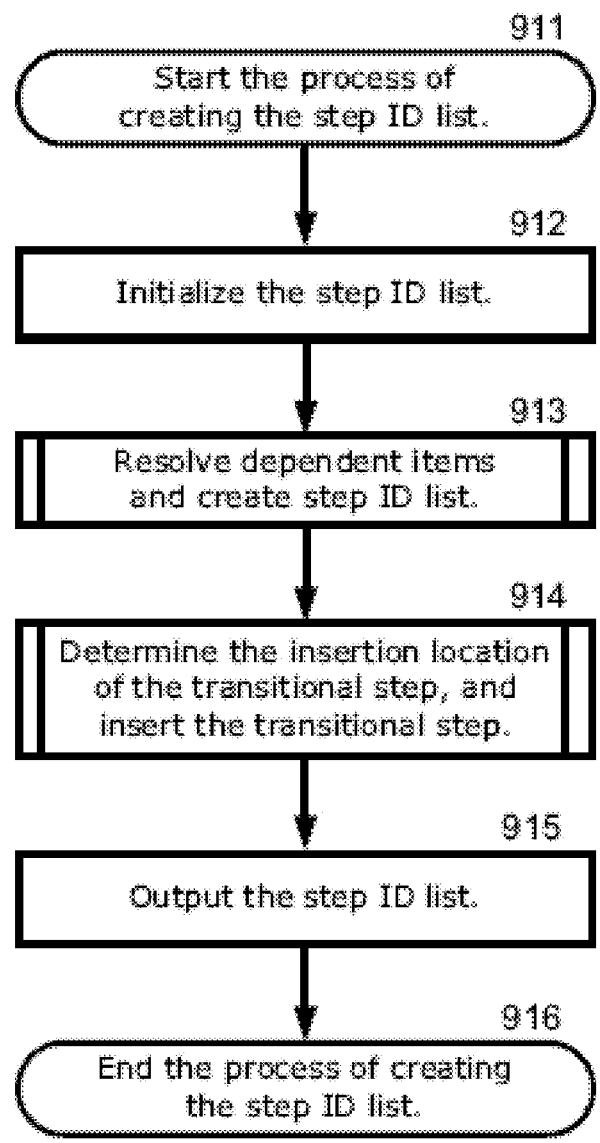
FIG. 9B shows an example of a flowchart for creating a step ID list in the process of dynamically creating a video on the basis of a structured document according to an embodiment of the present invention.
Figure 9C:
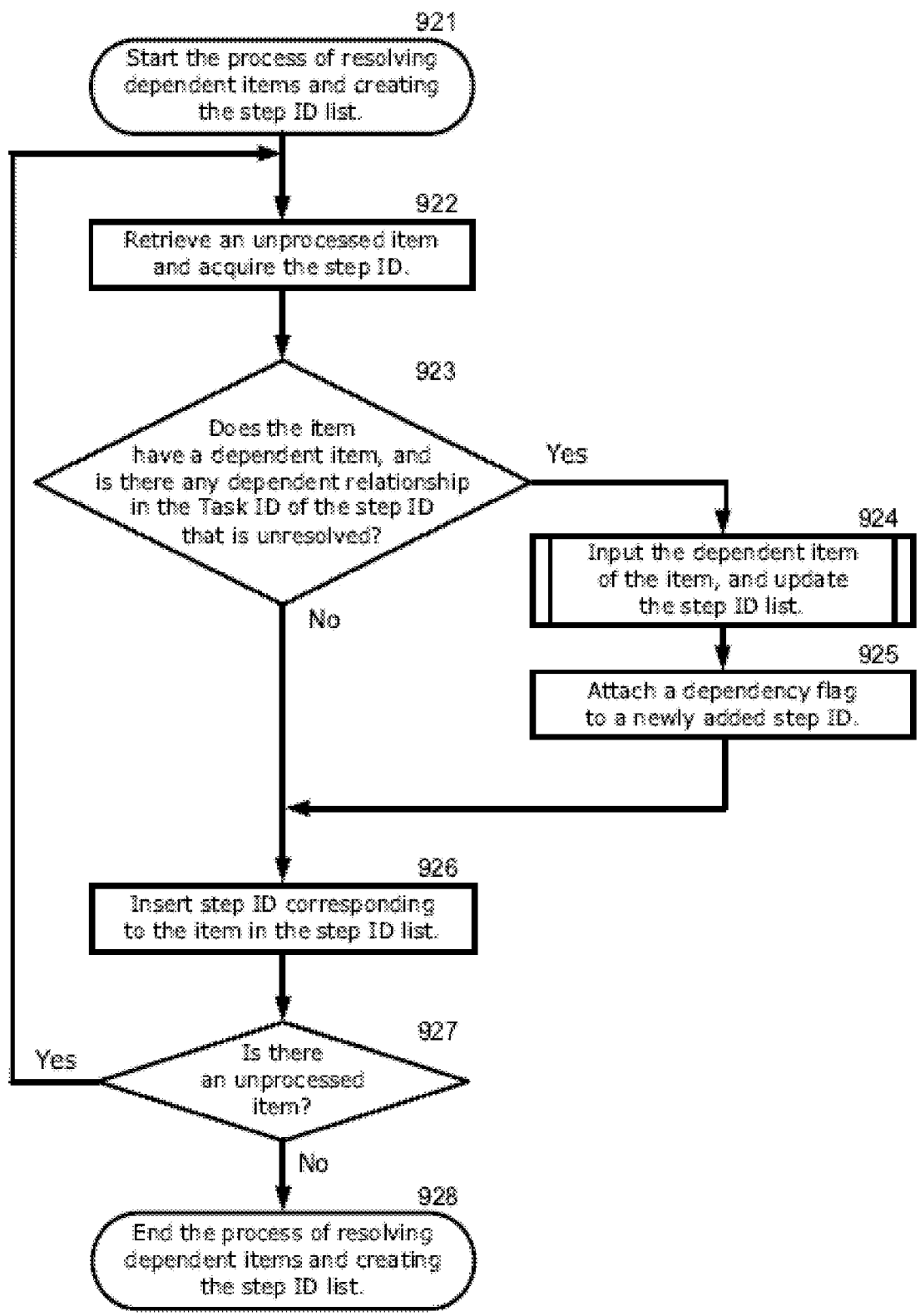
FIG. 9C shows an example of a flowchart for the process of resolving dependent items and creating a step ID list in the flowchart for creating a step ID list shown in FIG. 9B.
Figure 9D:
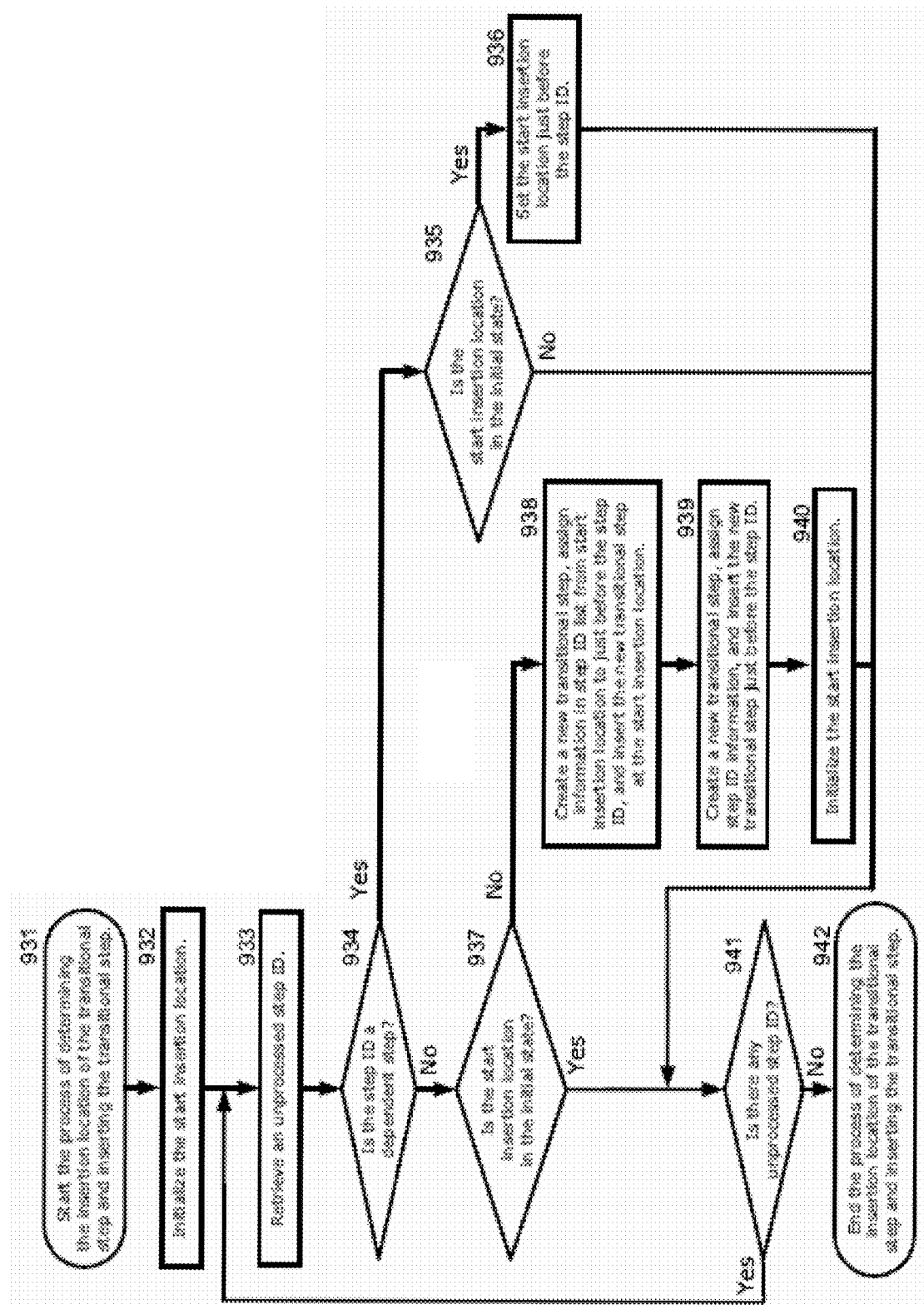
FIG. 9D shows an example of a flowchart for the process of determining the insertion locations for transitional steps in the step ID list created in accordance with the processing shown in the flowchart of FIG. 9C and inserting the transitional steps in the flowchart for creating a step ID list shown in FIG. 9B.

The electronic device may insert each dependent item having a dependency relationship with Step 3-3 through Step 3-10 and Step 9-1 through Step 9-3, that is, Step 2-1 through Step 2-10 (351) and Step 7-1 through Step 7-10 (352) in a step ID list (301) according to the flowchart for the process of creating a step ID list shown in FIG. 9B through FIG. 9D to a create step ID list (341). The step ID list (341) has Step 2-1 through Step 2-10 (351), Step 3-3 through Step 6-6 (311), Step 8-2 through Step 8-10 (312*a*), Step 7-1 through Step 7-10 (352), and Step 9-1 through Step 9-3 (312*b*). In this example, Step 2-1 through Step 2-10 (351) are inserted in front of Step 3-3 through Step 6-6 (311), and Step 7-1 through Step 7-10 (352) are inserted between Step 8-2 through Step 8-10 (312*a*) and Step 9-1 through Step 9-3 (312*b*) among Step 8-2 through Step 9-3 (312).

Alternatively, the electronic device may insert each of the identified dependent items having a dependent relationship with Step 3-3 through Step 3-10 and Step 9-1 through Step 9-3, that is, Step 2-1 through Step 2-10 and Step 7-1 through Step 7-10, in the step ID list (301), and then create a step ID list (not shown) by sorting according to step number or by referencing the dependency relationship flags showing the dependency relationships between the steps.

FIG. 3B shows an example in which video clips associated with user-selected items and dependent items in the step ID list (341) are identified in an embodiment of the present invention.

The electronic device may identify video clips associated with each item in the step ID list (341) using video clip identifying table (361) or video clip identifying table (362) including step IDs (the IDs corresponding to item IDs), video clip IDs associated with the step IDs, or script IDs.

Both video clip identifying table (361) and video clip identifying table (362) include step IDs (IDs corresponding to items), and video clip IDs and script IDs associated with step IDs. Video clip identifying table (361) and video clip identifying table (362) may assume the format of a table or any other data format as long as video clip IDs or script IDs are associated with step IDs.

In video clip identifying table (361) and video clip identifying table (362), either a video clip ID or script ID is set for each step ID. Alternatively, in video clip identifying table (361) and video clip identifying table (362), both a video clip ID and a script ID may be set for each step ID. When both a video clip ID and a script ID are set for each step ID in video clip identifying table (361) and video clip identifying table (362), the user either selects video clip IDs or script IDs during video selection, or a priority is established between video clip IDs and script IDs in video clip identifying table (361) and video clip identifying table (362).

In video clip identifying table (361), the video clip IDs and script IDs may be denoted using alphanumeric identifiers. There are no particular restrictions on the type of alphanumeric characters that are used (uppercase letters, lowercase letters, or numerals) or the number of characters used as long as the uniqueness of each sequence can be ensured. For example, if identifiers composed of four columns of uppercase letters and numerals are used, approximately 1.68 ($36^4$) million unique identifiers can be used In video clip identifying table (362), the video clip IDs and script IDs may be denoted using URLs as identifiers which allow video clips or scripts to be downloaded or accessed. These URL identifiers can take the form of an ID such as "ABCX" at the end of a URL, such as "http://example.com/scripts/ABCX". Alternately, these URL identifiers can be defined using an independent protocol scheme, such as "dmcp://example.com/scripts/ABCX" (where dmcp=Document and Movie Control Protocol). A file on a computer can be referenced using "file:///Users/admin/Documents/scripts/ABCX.bat", and a uniform resource identifier (URI) superordinate to a URL can be used as an ID for clips and scripts by various providers instead of not indicating an address directly, such as "cid:ABCX@example.com".

The electronic device uses the video clip identifying table (361) to acquire the video clip ID or script ID associated with the step ID corresponding to a step number in the step ID list (341), and associates the acquired video clip ID or script ID with the step in the step ID list (341). For example, the electronic device associates script ID "3R4P" with Step 2-1 through Step 2-4 (351) in the step ID list (341), associates script ID "FR4T" with the Step 2-5 through Step 2-6 (351), and associates script ID "E34R" with Step 2-7 through Step 2-10 (351). The electronic device associates video clip IDs or script IDs with Step 3-3 through Step 6-6 (311), Step 8-2 through Step 8-10 (312a), Step 7-1 through Step 7-10 (352), and Step 9-1 through Step 9-3 (312b) in the same way. The electronic device can dynamically create a provisional video by linking the video clips associated with the associated video clip IDs or script IDs.

Similarly, the electronic device uses the video clip identifying table (362) to acquire the video clip ID or script ID associated with the step ID corresponding to a step number in the step ID list (341), and associates the acquired video clip ID or script ID with the step in the step ID list (341). The electronic device can dynamically create a provisional video by linking the video clips associated with the associated video clip IDs or script IDs.

Figure 3C:
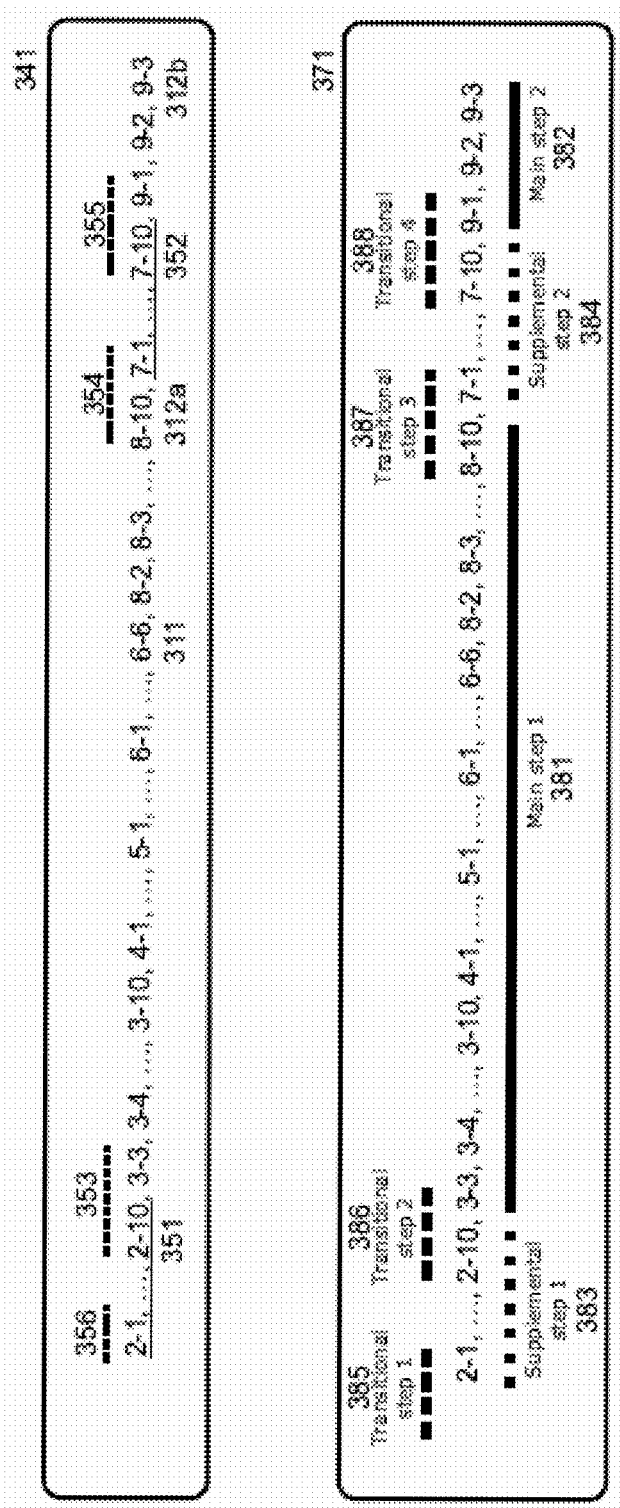
FIG. 3C shows an example of video clips in a video classified according to different categories ("main step", "transitional step" and "supplemental step") according to an embodiment of the present invention.

FIG. 3C shows an example in which the video clips in a video are classified by category ("main step", "transitional step" and "supplemental step") in an embodiment of the present invention.

The step ID list (341) is the same step ID list (341) shown in FIG. 3A, and has Step 2-1 through Step 2-10 (351), Step 3-3 through Step 6-6 (311), Step 8-2 through Step 8-10 (312a), Step 7-1 through Step 7-10 (352) and Step 9-1 through Step 9-3 (312b). Video clips are associated with each step using the process shown in FIG. 3B.

The electronic device sets the category of the video clips associated with items in the step ID list (341) identified by the user (Step 3-3 through Step 6-6 (311), Step 8-2 through Step 8-10 (312a), and Step 9-1 through Step 9-3 (312b)) to "main step".

The electronic device sets the category of the video clips associated with other items in the step ID list (341) identified by the user (Step 2-1 through Step 2-10 (351) and Step 7-1 through Step 7-10 (352)) to "supplemental step".

The electronic device sets the category of the video clips associated with items directly adjacent to items and dependent items in the step ID list (341) identified by the user (the set Step 2-10 through Step 3-3 (353), the set Step 8-10 through Step 7-1 (354) and the Step 7-10 through Step 9-1 (355)) to "transitional step". When the beginning step in the step ID list (341) is a supplemental step, the category of the video clip associated with Step 2-1 (356) is also set to "transitional step" because a transitional step has to be played at the video start point. A transitional step is a portion corresponding to a scene change. When a video clip is set as a transitional step, the transitional step may be added to a supplemental step/main step/main step/supplemental step combination or supplemental step/supplemental step combination. When the beginning of the step ID list (341) is a supplemental step, it may be a transitional step (the start step played at the video start point)/supplemental step combination.

In the categorized track (371), the two categories of supplemental step and transitional step have been applied, respectively, to the video clips associated with the beginning of a supplemental step (Step 2-1, Step 7-1), and to the video clips associated with the end of a supplemental step (Step 2-10, Step 7-10). Similarly, when a main step and a supplemental step are adjacent to each other, the two categories of main step and transitional step have been applied, respectively, to the video clips associated with the beginning of a main step (Step 3-3, Step 9-1), and to the video clip associated with the end of a main step (Step 8-10).

In the categorized track (371), the video clips associated with each item in the categorized track (371) were categorized as follows: transitional step 1 (385), supplemental step 1 (383), transitional step 2 (386), main step 1 (381), transitional step 3 (387), supplemental step 2 (384), transitional step 4 (388), and main step 2 (382).

In the categorized track (371), video clips are associated with each in the categorized steps: transitional step 1 (385), supplemental step 1 (383), transitional step 2 (386), main step 1 (381), transitional step 3 (387), supplemental step 2 (384), transitional step 4 (388), and main step 2 (382). As a result, the electronic device may dynamically create a video by linking transitional step 1 (385), supplemental step 1 (383), transitional step 2 (386), main step 1 (381), transitional step 3 (387), supplemental step 2 (384), transitional step 4 (388), and main step 2 (382).

By setting each video clip according to category ("main step", "transitional step", "supplemental step"), a video can be played back in different ways by category. The following are examples of playback by category.

The electronic device plays the video back at 1× speed in a main step.

In a transitional step, the electronic device may acquire the item (chapter, section, etc.) to be explained in the main step or supplemental step following the transitional step, and display the title or summary associated with the item. In a transitional step, the electronic device may also display a short explanatory passage such as "Item Y, on which Item X is premised, will now be explained" for a set period of time.

In a supplemental step, the electronic device affixes flags for playback according to attributes described below. Playback information for video clips categorized as supplemental steps includes (time, playback speed, capture information, and display method such as display range and display position. Attributes include the default or user-established playback time (for example, 30 seconds or 60 seconds), playback speed (slower than 1×, or 2×, 4× or 6×), playback-or-skip, and playback window size.

For example, the electronic device may play back a video clip associated with a supplemental step faster than 1× (or the full playback speed) in accordance with playback information affixed to the video clip.

In a supplemental step, the electronic device may also play back the video clip categorized as a supplemental step at a playback time established by the user or at the default playback time. The following is an example of playback times.

0: Not played back at all (skipped);
X: For example, 15 seconds or 30 seconds (0<X<FULL);
FULL: Played back at normal speed In a supplemental step, the video clip categorized as a supplemental video clip may be played back in digest form. The following are examples of playback in digest form.
(1) Screenshots are taken of the video clip associated with the supplemental step at a predetermined interval (such as 10 seconds), and the screenshots are played back;
(2) Screenshots are taken of the video clip associated with the supplemental step at a predetermined interval (such as 10 seconds), the screenshots are summarized in one or more images, and the summarized images are displayed or played back for a predetermined period of time (such as 60 seconds);
(3) When chapters are to be skipped through in a video clip associated with a supplemental step, several seconds or several dozen seconds (for example, 5 seconds) at the start of each chapter are linked together and played back; or
(4) The video clip is played back at a speed faster than 1× (such as 2×, 4× or 6×).

Figure 4A:
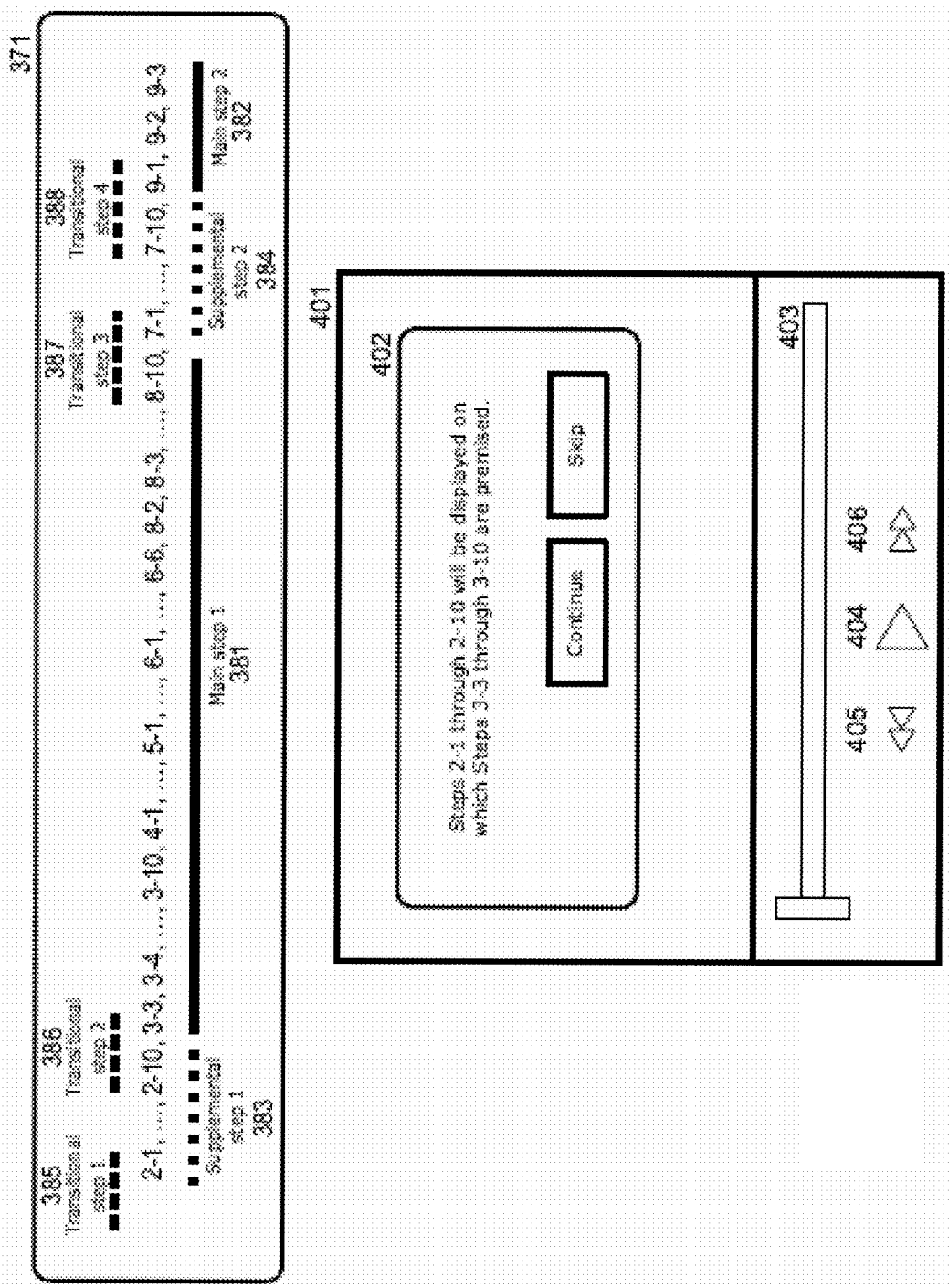
FIG. 4A shows an example of a user interface for classifying video clips constituting the video according to the "transitional step" category according to an embodiment of the present invention.
Figure 4B:
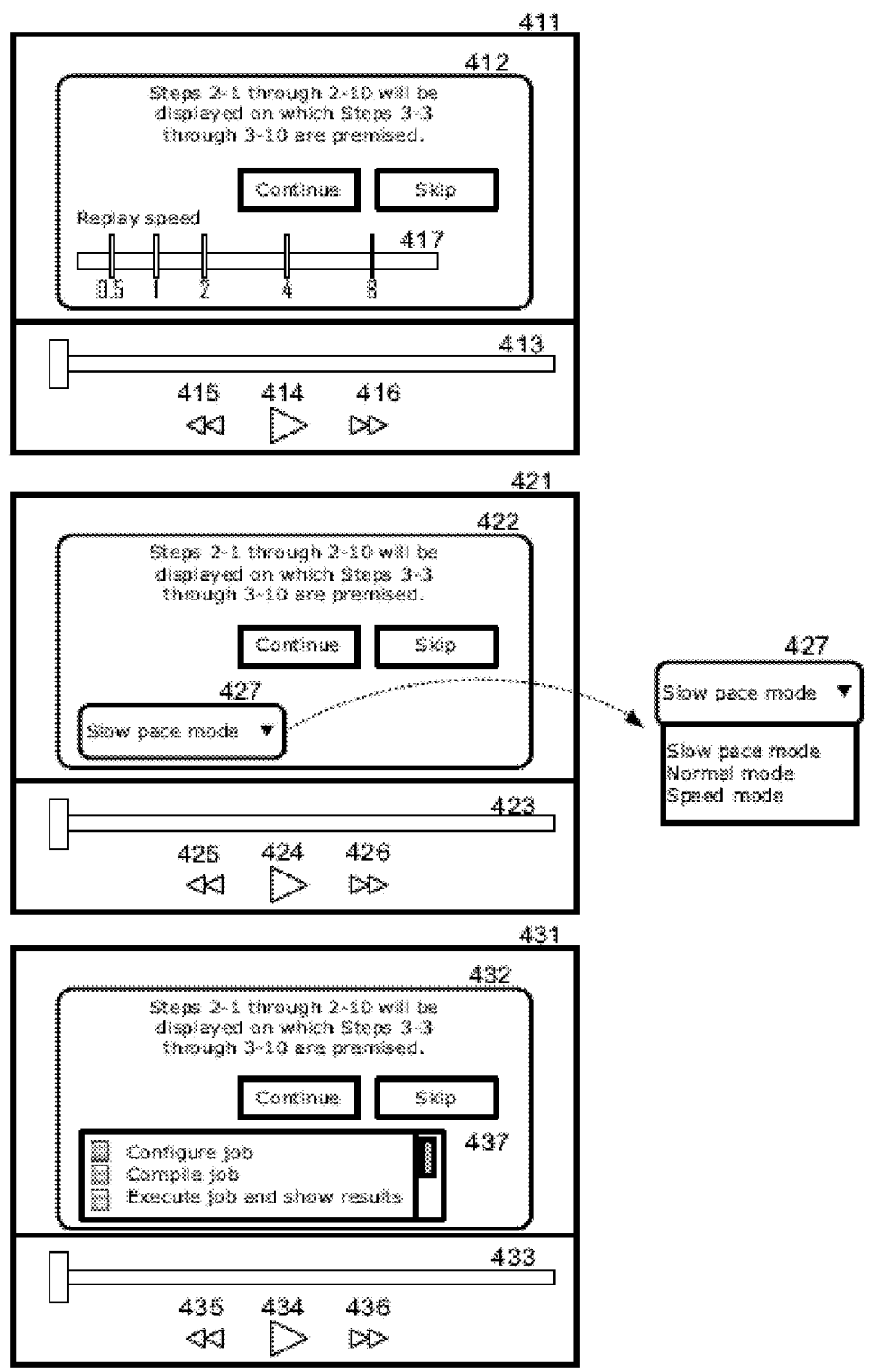
FIG. 4B shows an example of a user interface for classifying video clips constituting the video according to the "transitional step" category according to an embodiment of the present invention.

FIG. 4A and FIG. 4B show an example of a user interface of video clips categorized as transitional steps in an embodiment of the present invention.

The screen (401) shown in FIG. 4A shows an example of the video clips categorized as transitional step 1 (385) in the track (371) categorized as shown in FIG. 3C. The video clips categorized as transitional steps are played back during a transition from a supplemental step to a main step, from a main step to a supplemental step, or from a supplemental step to another supplemental step.

Window (402) is displayed inside screen (401) to allow the user to confirm whether or not the transitional step is to be displayed. Window (402) includes a "continue" button for playing back Step 2-1 through Step 2-10, and a "skip" button for skipping playback of Step 2-1 through Step 2-10.

Screen (401) also includes a slider (403) for controlling the playback spot in the video clips associated with Steps 2-1 through Step 2-10 (351), a start button (404) for starting the playback of the video clips, a rewind button (405) for playing back a video clip again, and a fast forward button (406) for fast forwarding through the playback of the video clips.

Screen (411) shown in FIG. 4B includes a slider bar (417) that can be used to adjust the playback speed of the video clips to, for example, 0.5×, 1×, 2×, 4× or 8×. The user may adjust the slider bar (417) to change the playback speed of the video clips to the desired speed.

Screen (421) shown in FIG. 4B has a pull-down menu (427) allowing the user to set the playback of the video clips to "slow pace mode" (for example, playback at 0.5×), "normal mode" (for example, playback at 1×), and "speed mode" (for example, playback at 2×). The user may select any mode from the pull-down menu (427) to play back the video clips using the desired mode.

Screen (431) shown in FIG. 4B has a scroll menu (437) allowing the user to select a specific step among Step 2-1 through Step 2-10 (351) on which Step 3-3 through Step 3-10 are premised. The user may select one or more items from the scroll menu (437) in order to play back video clips associated with the desired item.

Figure 5A:
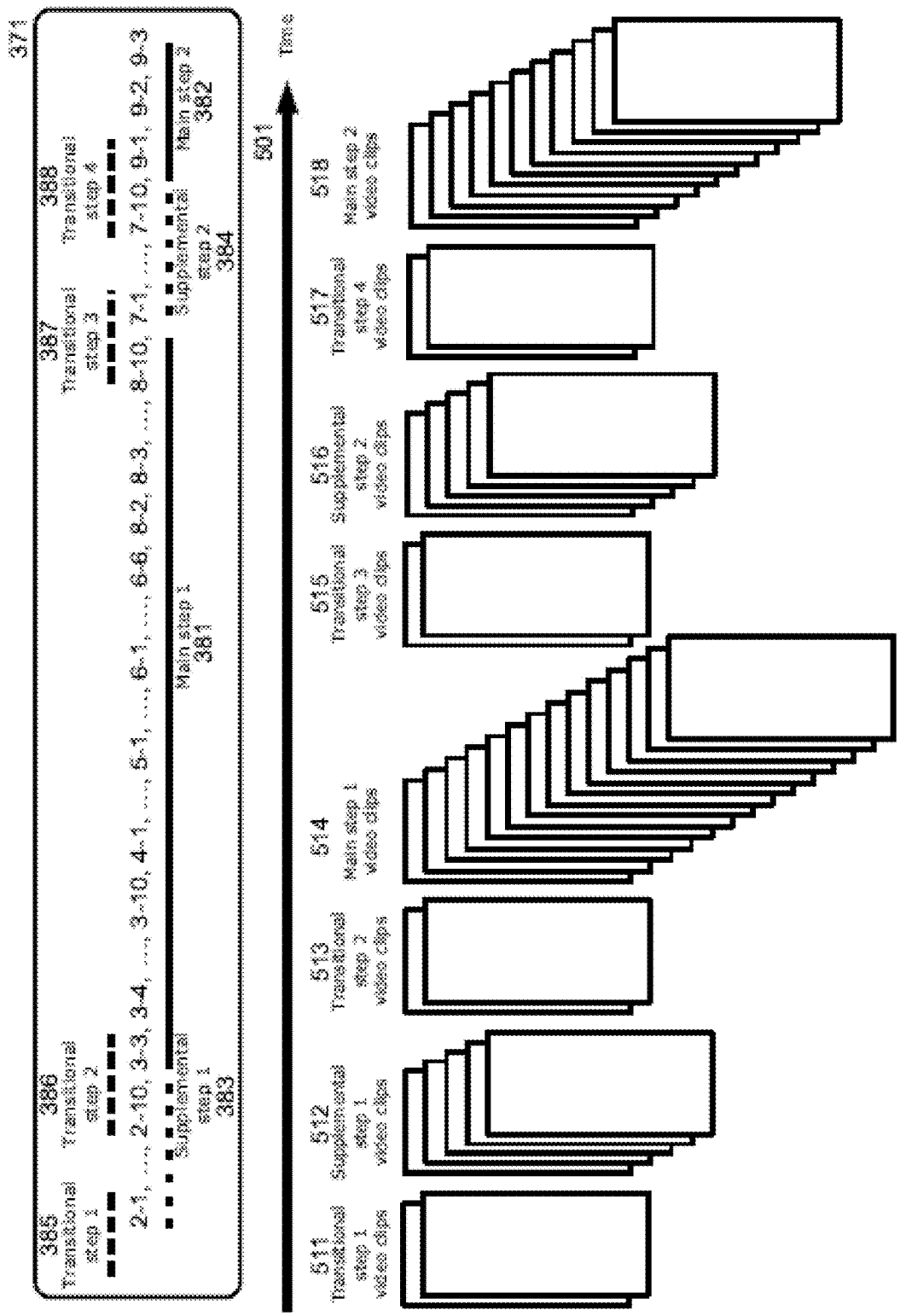
FIG. 5A shows an example of video clips associated with user-selected items and dependent items, and an example of a video composed of these video clips according to an embodiment of the present invention.

FIG. 5A shows an example of video clips associated with user-selected items and dependent items and a video composed of the video clips in an embodiment of the present invention.

The categorized track (371) is the same categorized track (371) shown in FIG. 3C. In the categorized track (371), video clips are associated with each of the categorized steps: transitional step 1 (385), supplemental step 1 (383), transitional step 2 (386), main step 1 (381), transitional step 3 (387), supplemental step 2 (384), transitional step 4 (388), and main step 2 (382).

In FIG. 5A, the respective video clips associated with transitional step 1 (385), supplemental step 1 (383), transitional step 1 (386), main step 1 (381), transitional step 3 (387), supplemental step 2 (384), transitional step 4 (388) and main step 2 (382) are transitional step 1 video clip (511), supplemental step 1 video clip (512), transitional step 2 video clip (513), main step 1 video clip (514), transitional step 3 video clip (515), supplemental step 2 video clip (516), transitional step 4 video clip (517) and main step 2 video clip (518). The electronic device may dynamically create a video by linking together transitional step 1 video clip (511), supplemental step 1 video clip (512), transitional step 2 video clip (513), main step 1 video clip (514), transitional step 3 video clip (515), supplemental step 2 video clip (516), transitional step 4 video clip (517) and main step 2 video clip (518). When the electronic device is a user terminal, the electronic device may play back the created video.

Figure 5B:
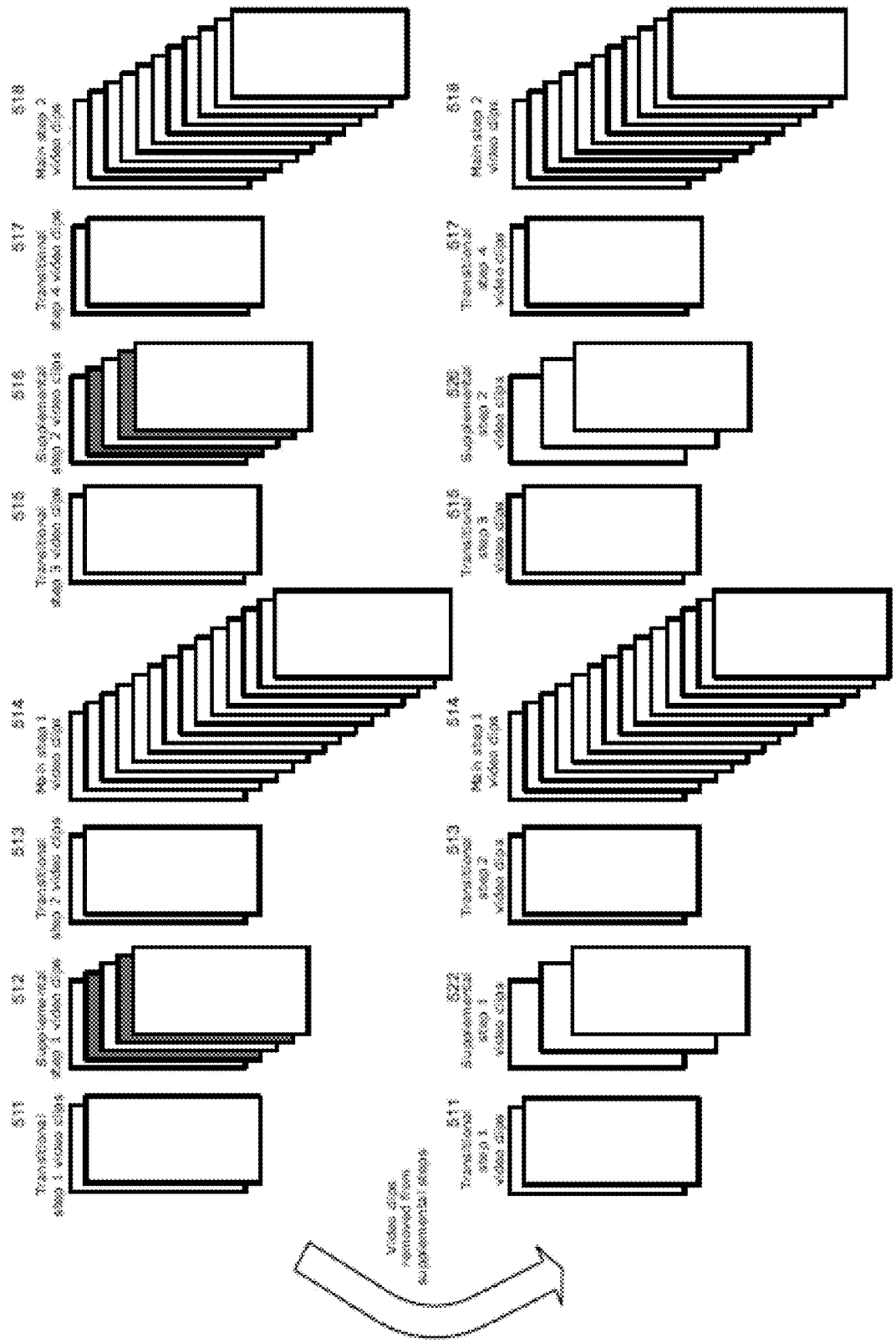
FIG. 5B shows an example in which some of the video clips constituting the video and classified according to the "supplemental step" category are removed according to an embodiment of the present invention.
Figure 5C:
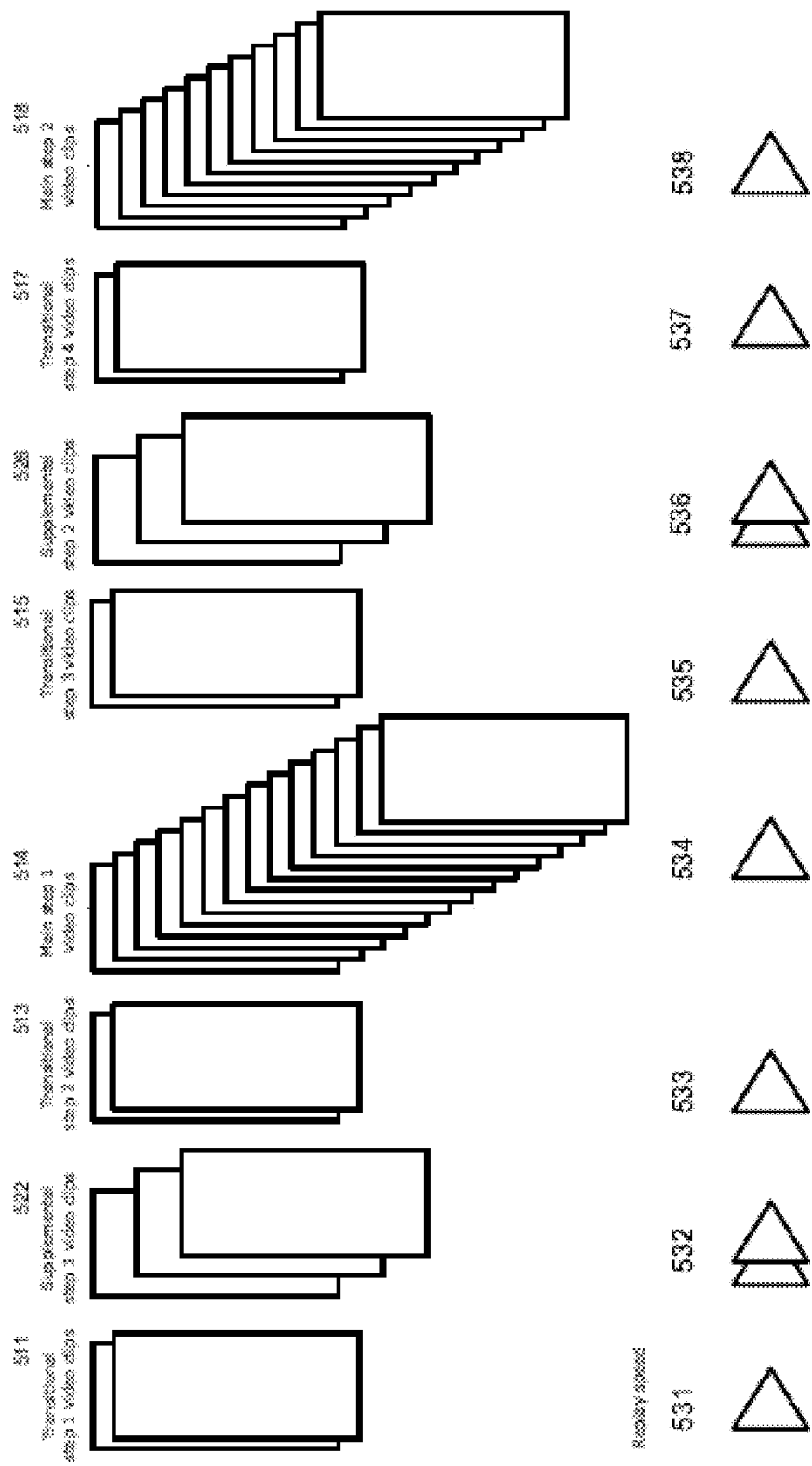
FIG. 5C shows an example in which the video clips constituting the video and classified according to the "supplemental step" category are played back faster than the video clips classified according to the "main step" and "transitional step" categories.

FIG. 5B shows an example in which a portion of the video clips constituting the video and categorized as supplemental steps is deleted in an embodiment of the present invention.

In response to an instruction to increase the playback speed of video clips categorized as supplemental steps or in response to a setting increasing the playback speed of video clips categorized as supplemental steps, the electronic device may delete a certain number of sections (scenes) from video clips associated the supplemental steps (that is, supplemental step 1 video clip (512) and supplemental step 2 video clip (516)). In supplemental step 1 video clip (512) and supplemental step 2 video clip (516), the deleted portions are the filler portions.

Supplemental step 1 video clip (522) and supplemental step 2 video clip (526) denote the same video clips after the filler portions have been deleted from supplemental step 1 video clip (512) and supplemental step 2 video clip (516).

The electronic device may dynamically create a video by linking together transitional step 1 video clip (511), supplemental step 1 video clip (522), transitional step 2 video clip (513), main step 1 video clip (514), transitional step 3 video clip (515), supplemental step 2 video clip (526), transitional step 4 video clip (517) and main step 2 video clip (518). When the electronic device is a user terminal, the electronic device may play back the created video. When the electronic device is a user terminal, the electronic device may play back the created video.

FIG. 5C shows an example in which video clips constituting the video and categorized as supplemental steps are played back at a speed faster than video clips categorized as main steps or transitional steps in an embodiment of the present invention.

In response to an instruction to increase the playback speed of video clips categorized as supplemental steps or in response to a setting increasing the playback speed of video clips categorized as supplemental steps, the electronic device sets the playback of supplemental step 1 video clip (522) and supplemental step 2 video clip (526) to a speed (532, 536) faster than the playback speeds (531, 533, 534, 535, 537, respectively) of the other video clips (transitional step 1 video clip (511), transitional step 2 video clip (513), main step 1 video clip (514), transitional step 3 video clip (515), transitional step 4 video clip (517) and main step 2 video clip (518)).

FIG. 6A through FIG. 6C and FIG. 7A through FIG. 7C show embodiments other than the embodiment shown in FIG. 3A through FIG. 3C.

Figure 6A:
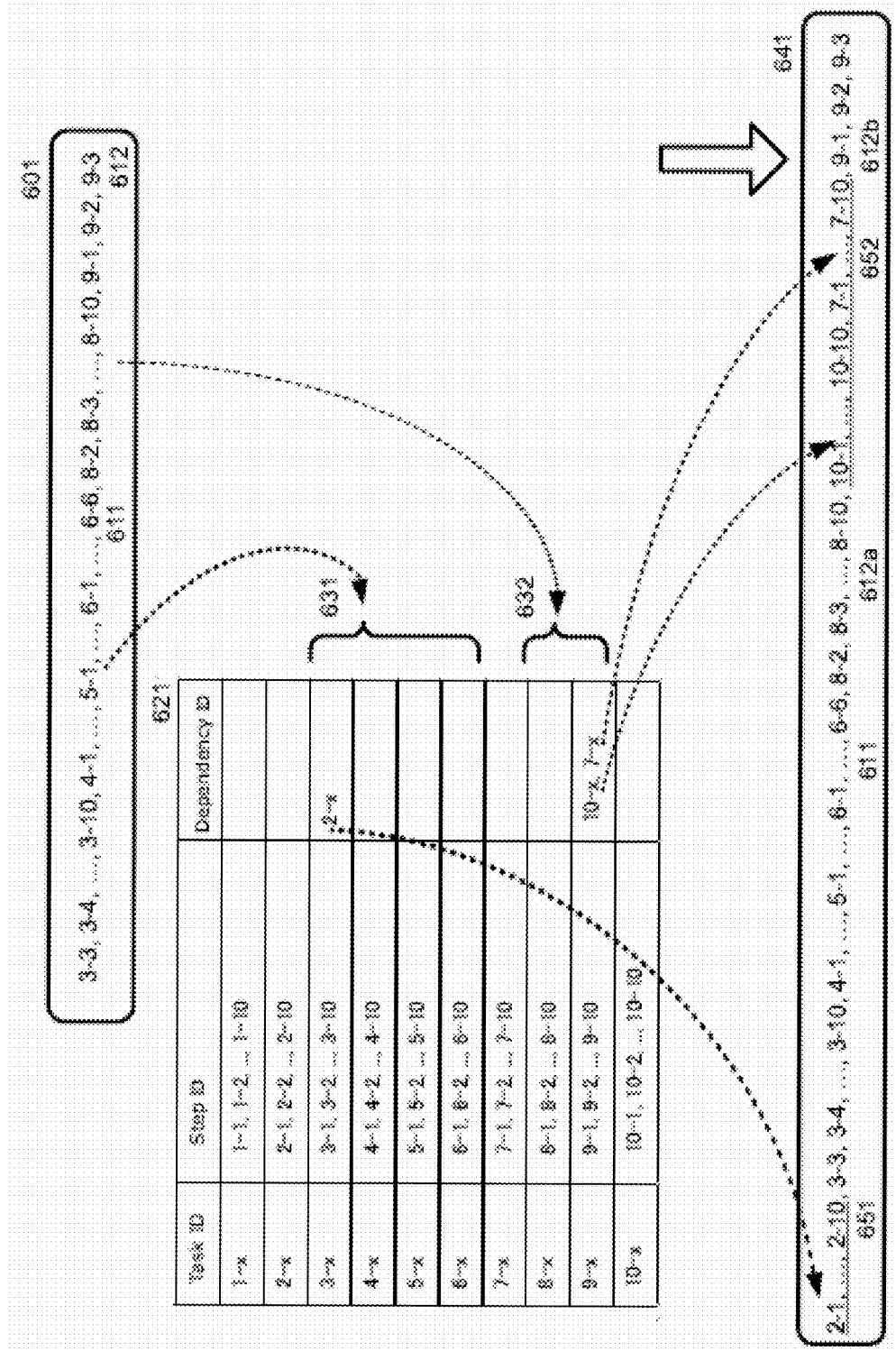
FIG. 6A shows an example of a dependent item having a dependent relationship with a user-specified item being identified according to an embodiment of the present invention different from the embodiment shown in FIG. 3A.

FIG. 6A shows an example in which dependent items having a dependent relationship with user-selected items are identified in an embodiment of the present invention. This embodiment is different from the one shown in FIG. 3A.

In the step ID list (601) shown in FIG. 6A, the items selected by the user in FIG. 2C through FIG. 2D, that is, Step 3-3 through Step 6-6 (611) and Step 8-2 through Step 9-3 (612), are linked.

The electronic device may identify which dependent items have a dependent relationship with the items in the step ID list (601) using the dependent item identifying table (621). In the dependent item identifying table (621), the steps with step IDs 3-3 through 3-10 have a dependent relationship with the steps having step IDs 2-x (that is, Step 2-1 through Step 2-10). Also, in the dependent item identifying table (621), the steps with step IDs 9-1 through 9-10 have a dependency relationship with the steps having step IDs 10-x and 7-x (that is, Step 10-1 through Step 10-10 and Step 7-1 through Step 7-10). The dependent item identifying table (621) may assume the format of a table or any other data format as long as step IDs are associated with dependency IDs.

The electronic device uses the dependency item identifying table (621) to determine that Step 3-3 through Step 3-10 among Step 3-3 through Step 6-6 (611) have a dependency relationship with Steps 2-x (that is, Step 2-1 through Step 2-10) (631).

Similarly, the electronic device uses the dependency item identifying table (621) to determine that Step 9-1 through Step 9-3 among Step 8-2 through Step 9-3 (612) have a dependency relationship with Steps 10-x and Steps 7-x (that is, Step 10-1 through Step 10-10 and Step 7-1 through Step 7-10) (632). Because the dependency IDs in the dependent item identifying table (621) are listed in the order 10-x then 7-x, the electronic device determines that Step 10-1 through Step 10-10 are items preceding Step 7-1 through Step 7-10 (632). These are preceding items because the video clips associated with Step 10-1 through Step 10-10 are played back prior to the video clips associated with Step 7-1 through Step 7-10.

Each of Step 2-1 through Step 2-10 (651), and Step 10-1 through Step 10-10 and Step 7-1 through Step 7-10 (652) identified as having a dependent relationship are inserted by the electronic device into the step ID list (601) according to, for example, the flowchart for creating a step ID list shown in FIG. 9B through FIG. 9D in order to create step ID list (641). Step ID list (641) has Step 2-1 through Step 2-10 (651), Step 3-3 through Step 6-6 (611), Step 8-2 through Step 8-10 (612a), Step 10-1 through Step 10-10 and Step 7-1 through Step 7-10 (652), and Step 9-1 through Step 9-3 (612b). Step 10-1 through Step 10-10 and Step 7-1 through Step 7-10 (652) are listed in the order Step 10-1 through Step 10-10 and Step 7-1 through Step 7-10 (652) in the step ID list (641) and the dependency IDs are listed in the order 10-x and 7-x in the dependent item identifying table (621) because Step 10-1 through Step 10-10 are items that precede Step 7-1 through Step 7-10. In this example, Step 2-1 through Step 2-10 (651) are inserted before Step 3-3 through Step 6-6 (611), and Step 10-1 through Step 10-10 and Step 7-1 through Step 7-10 (652) are inserted between Step 8-2 through Step 8-10 (612a) and Step 9-1 through Step 9-3 (612b) among Step 8-2 through Step 9-3 (612).

Alternatively, the electronic device may create a step ID list (not shown) by inserting items specified as having a dependent relationship with Step 3-3 through Step 3-10 and Step 9-1 through Step 9-3, that is, Step 2-1 through Step 2-10 as well as Step 10-1 through Step 10-10 and Step 7-1 through Step 7-10, into step ID list (601) and then sorting the items by step number or in reference to dependent relationship flags indicating the step with which there is a dependent relationship.

Figure 6B:
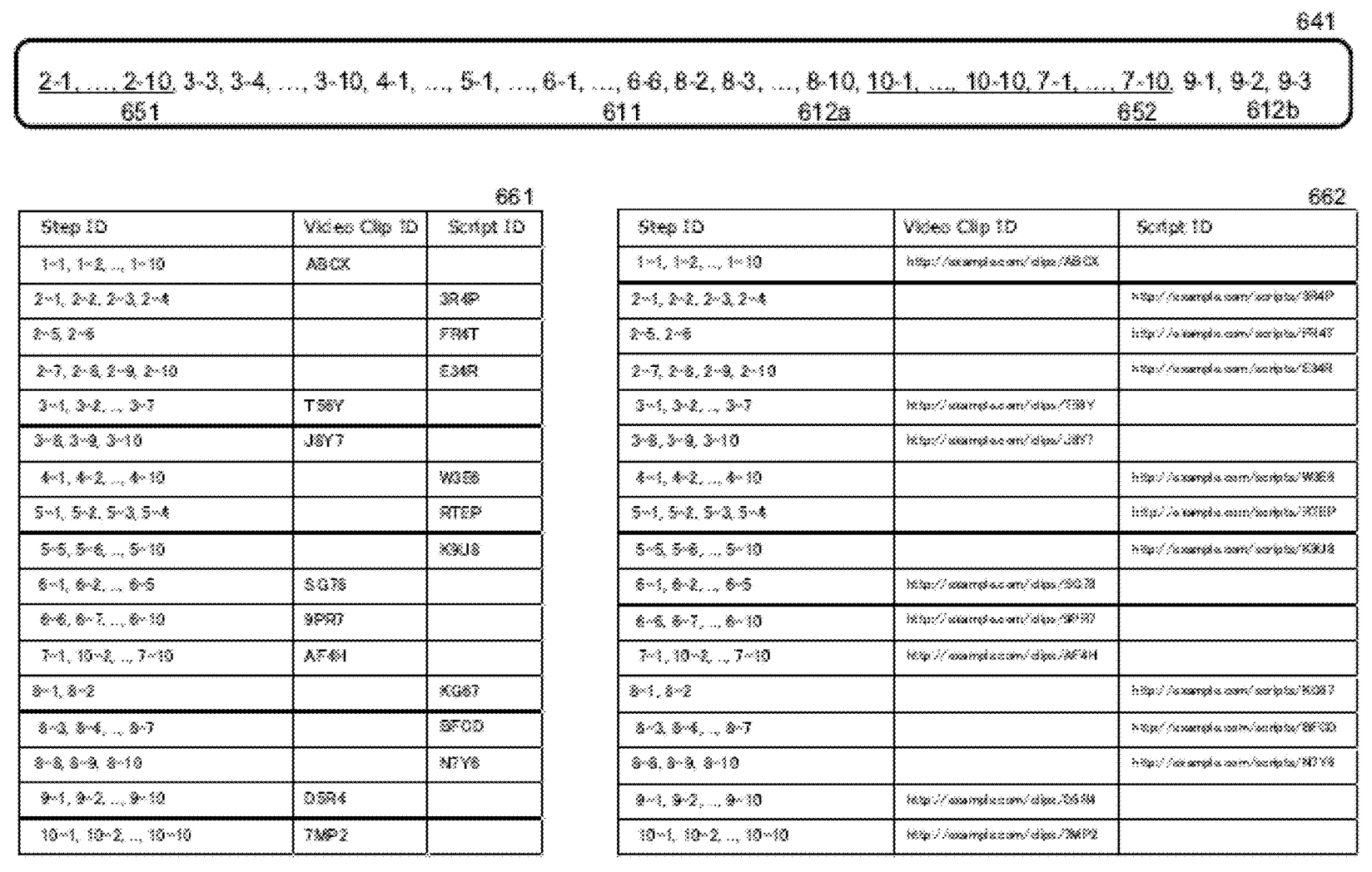

FIG. 6B shows an example in which the video clips associated with user-selected items and dependent items in step ID list (641) are identified in an embodiment of the present invention. This embodiment is different from the one shown in FIG. 3B.

The electronic device may identify the video clips associated with each item in the step ID list (641) using video clip identifying table (661) or video clip identifying table (662).

The electronic device uses the video clip identifying table (661) to acquire the video clip ID or script ID associated with the step ID corresponding to a step number in the step ID list (641), and associates the acquired video clip ID or script ID with the step in the step ID list (641). The electronic device can dynamically create a provisional video by linking the associated video clips or scripts.

Similarly, the electronic device uses the video clip identifying table (662) to acquire the video clip ID or script ID associated with the step ID corresponding to a step number in the step ID list (641), and associates the acquired video clip ID or script ID with the step in the step ID list (641). The electronic device can dynamically create a provisional video by linking the associated video clips or scripts.

Figure 6C:
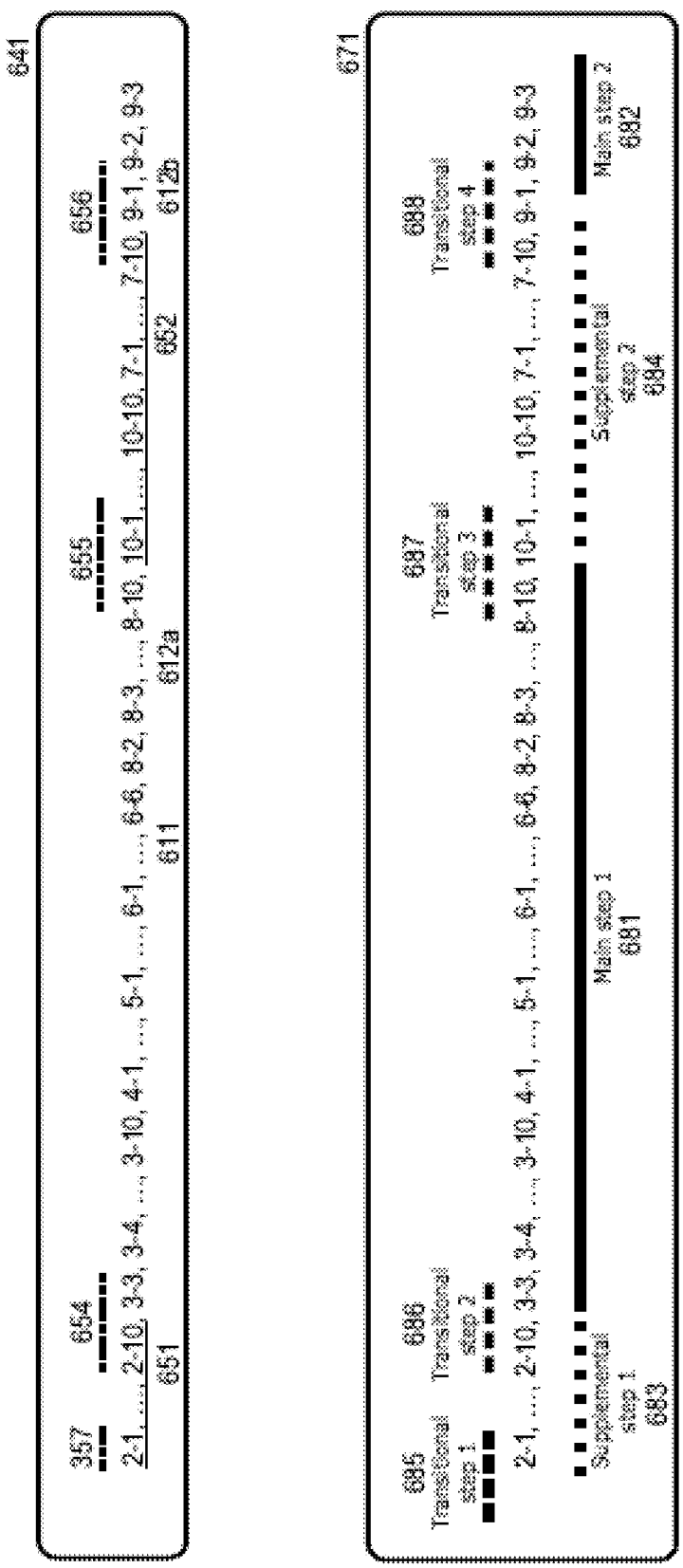
FIG. 6C shows an example of video clips in a video classified according to different categories ("main step", "transitional step" and "supplemental step") according to an embodiment of the present invention different from the embodiment shown in FIG. 3C.

FIG. 6C shows an example in which the video clips in a video are classified by category ("main step", "transitional step", supplemental step"). This embodiment is different from the one shown in FIG. 3C.

The step ID list (641) shown in FIG. 6C is the same step ID list (641) shown in FIG. 6B, and has Step 2-1 through Step 2-10 (651), Step 3-3 through Step 6-6 (611), Step 8-2 through Step 8-10 (612*a*), Step 7-1 through Step 7-10 (652) and Step 9-1 through Step 9-3 (612*b*). Video clips are associated with each step using the process shown in FIG. 6B.

The electronic device sets the category of the video clips associated with items in the step ID list (641) identified by the user (Step 3-3 through Step 8-10 (612*a*) and Step 9-1 through Step 9-3 (612*b*)) to "main step".

The electronic device sets the category of the video clips associated in the step ID list (641) with dependent items identified as having a dependent relationship with user-specified items (Step 2-1 through Step 2-10 (651), and Step 10-1 through Step 10-10 and Step 7-1 through Step 7-10 (652)) to "supplemental step".

The electronic device sets the category of the video clips associated with items directly adjacent to items and dependent items in the step ID list (641) identified by the user (the set Step 2-10 through Step 3-3 (654), the set Step 8-10 through Step 10-1 (655), and the Step 7-10 through Step 9-1 (656)) to "transitional step". When the beginning step in the step ID list (641) is a supplemental step, the category of the video clip associated with Step 2-1 (657) is also set to "transitional step" because a transitional step has to be played at the video start point. A transitional step is a portion corresponding to a scene change. When a video clip is set as a transitional step, the transitional step may be added to a supplemental step/main step/main step/supplemental step combination or supplemental step/supplemental step combination. When the beginning of the step ID list (641) is a supplemental step, it may be a transitional step (the start step played at the video start point)/supplemental step combination.

In the categorized track (671), the two categories of supplemental step and transitional step have been applied, respectively, to the video clips associated with the beginning of a supplemental step (Step 2-1, Step 10-1), and to the video clips associated with the end of a supplemental step (Step 2-10, Step 7-10). Similarly, when a main step and a supplemental step are adjacent to each other, the two categories of main step and transitional step have been applied, respectively, to the video clips associated with the beginning of a main step (Step 3-3, Step 9-1), and to the video clip associated with the end of a main step (Step 8-10).

In the categorized track (671), the video clips associated with each item in the categorized track (671) were categorized as follows: transitional step 1 (685), supplemental step 1 (683), transitional step 2 (686), main step 1 (681), transitional step 3 (687), supplemental step 2 (684), transitional step 4 (688), and main step 2 (682).

As in the case of FIG. 5A, a video clip is associated with transitional step 1 (685), supplemental step 1 (683), transitional step 2 (686), main step 1 (681), transitional step 3 (687), supplemental step 2 (684), transitional step 4 (688), and main step 2 (682) in the categorized track (671). Therefore, the electronic device can dynamically create a video by linking together transitional step 1 (685), supplemental step 1 (683), transitional step 2 (686), main step 1 (681), transitional step 3 (687), supplemental step 2 (684), transitional step 4 (688), and main step 2 (682). When the electronic device is a user terminal, the electronic device may play back the created video.

By categorizing each video clip (using "main step", "transitional step" and "supplemental step"), the video clips can be played back by category in different ways.

Figure 7A:
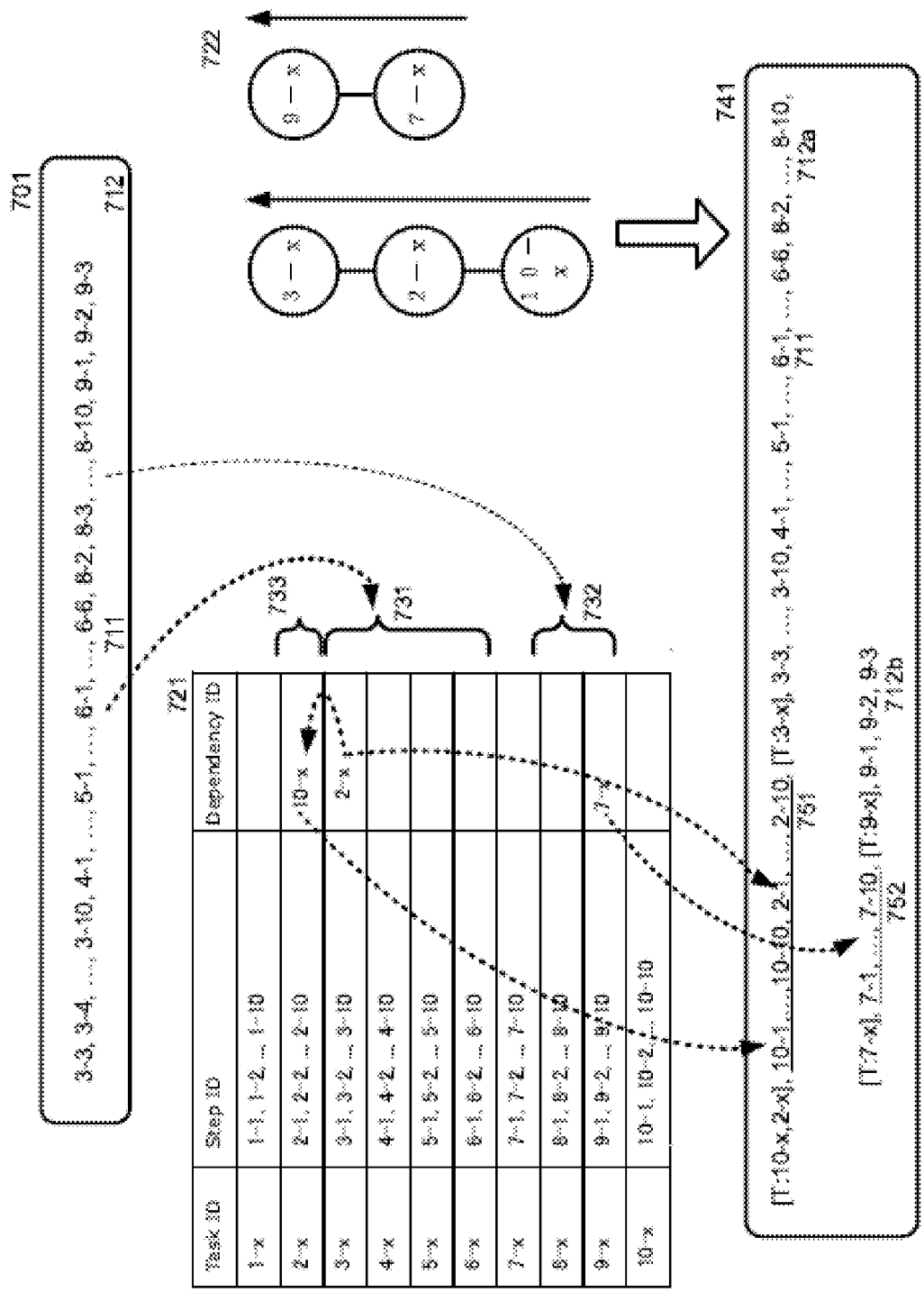
FIG. 7A shows an example of a dependent item having a dependent relationship with a user-specified item being identified according to an embodiment of the present invention different from the embodiment shown in FIG. 3A.

FIG. 7A shows an example in which dependent items having a dependent relationship with user-selected items are identified in an embodiment of the present invention. This embodiment is different from the ones shown in FIG. 3A and FIG. 6A.

In the step ID list (701) shown in FIG. 7A, the items selected by the user in FIG. 2C through FIG. 2D, that is, Step 3-3 through Step 6-6 (711) and Step 8-2 through Step 9-3 (712), are linked.

The electronic device may identify which dependent items have a dependent relationship with the items in the step ID list (701) using the dependent item identifying table (721). The dependent item identifying table (721) may assume the format of a table or any other data format as long as step IDs are associated with dependency IDs. The dependent item identifying table (721) may define dependent items recursively, for example, user-selected items, items dependent on user-selected items, items dependent on dependent items, etc.

In the dependent item identifying table (721), the steps with step IDs 3-3 through 3-10 have a dependent relationship with the steps having step IDs 2-*x* (that is, Step 2-1 through Step 2-10). Also, in the dependent item identifying table (621), the steps with step IDs 9-1 through 9-10 have a dependent relationship with the steps having step IDs 7-*x* (that is, Step 7-1 through Step 7-10). Similarly, the steps with step IDs 2-*x* (that is, Step 2-1 through Step 2-10), which are dependent on the steps with step IDs 3-3 through 3-10, in turn have a dependent relationship with the steps having step IDs 10-*x* (that is, Step 10-1 through Step 10-10).

The electronic device uses the dependency item identifying table (721) to determine that Step 3-3 through Step 3-10 among Step 3-3 through Step 6-6 (711) have a dependency relationship with Steps 2-*x* (that is, Step 2-1 through Step 2-10) (731).

Similarly, the electronic device uses the dependency item identifying table (721) to determine that Step 9-1 through Step 9-3 among Step 8-2 through Step 9-3 (712) have a dependency relationship with Steps 7-*x* (that is, Step 7-1 through Step 7-10) (732).

Similarly, the electronic device uses the dependency item identifying table (721) to determine that Steps 2-1 through Step 2-10 have a dependency relationship with Steps 10-*x* (that is, Step 10-1 through Step 10-10) (733).

The electronic device may insert "Step 2-1 through Step 2-10" and "Step 10-1 through Step 10-10 and Step 7-1 through Step 7-10" identified as having a dependency relationship into step ID list (701), and then sort each step by a predetermined reference such as dependency relationship flags (722) showing the dependency relationships of the steps to create a step ID list (741). The dependency relationship flags (722) are used to sort steps. For example, they are used to sort the steps in order from the leaves of the graph shown in FIG. 7A (using a so-called depth-first search).

In the step ID list (741), Step 10-1 through Step 10-10 (751) are sorted prior to Step 2-1 through Step 2-10 (752) because Steps 10-*x* precede Steps 2-*x* according to their relationship in the dependency relationship flags (722). Similarly, Step 2-1 through Step 2-10 (752) are sorted prior to Step 3-3 through Step 3-10 (711) because Steps 2-*x* precede Steps 3-*x* according to their relationship in the dependency relationship flags (722). Similarly, Step 7-1 through Step 7-10 (753) are sorted prior to Step 9-1 through Step 9-3 (712) because Steps 7-*x* precede Steps 9-*x* according to their relationship in the dependency relationship flags (722).

In the step ID list (741), data (such as a flag) is appended to each step ID indicating whether the step was selected by the user or inserted as a result of resolving a dependency relationship with a user-selected step. In the step ID list (741), the data may be used to differentiate non-underlined steps (711 and 712) and underlined steps (751, 752, 753).

As shown in the step ID list (741), the electronic device may insert a transitional step (for example, "T: task ID") before and after a step inserted as a result of resolving a dependency relationship (corresponding to a supplemental step). For example, the transitional steps in the step ID list (741) are [T:10-*x*, 2-*x*] and [T:3-*x*], and [T:7-*x*] and [T:9-*x*]. Here, [T:10-*x*, 2-*x*] is a transitional step inserted at the beginning of the "supplemental step" category appended to video clips associated with Step 10-1 through Step 10-10 and Step 2-1 through Step 2-10. Similarly, [T:3-*x*] is a transitional step inserted at the end of the "supplemental step" category appended to video clips associated with Step 10-1 through Step 10-10 and Step 2-1 through Step 2-10. Similarly, [T:7-*x*] is a transitional step inserted at the beginning of the "supplemental step" category appended to video clips associated with Step 7-1 through Step 7-10. Similarly, [T:9-*x*] is a transitional step inserted at the end of the "supplemental step" category appended to video clips associated with Step 7-1 through Step 7-10. The transitional steps inserted at the end of the "supplemental step" category (for example, [T:3-*x*] and [T:9-*x*]) are used as steps indicating a transition to a main step (that is, a clip notifying the user of a transition to a main step).

Alternatively, the electronic device may insert a place holder (for example, the set [5: task ID] and [E: task ID]) before and after a step inserted as a result of resolving a dependency relationship in order to indicate the location at which a transitional step video clip is to be inserted. In [5: task ID], "S" means the start of the inserted step. In [E: task ID], "E" means the end of the inserted step. The electronic device may insert [S:10-X] and then [E:10-X] before Step 10-1 through Step 10-10 inserted as a result of resolving a dependency relationship, insert [S:2-X] and then [E:2-X] before Step 2-1 through Step 2-10 inserted as a result of resolving a dependency relationship, and insert [S:7-X] and then [E:7-X] before Step 7-1 through Step 7-10 inserted as a result of resolving a dependency relationship (not shown).

Figure 7B:
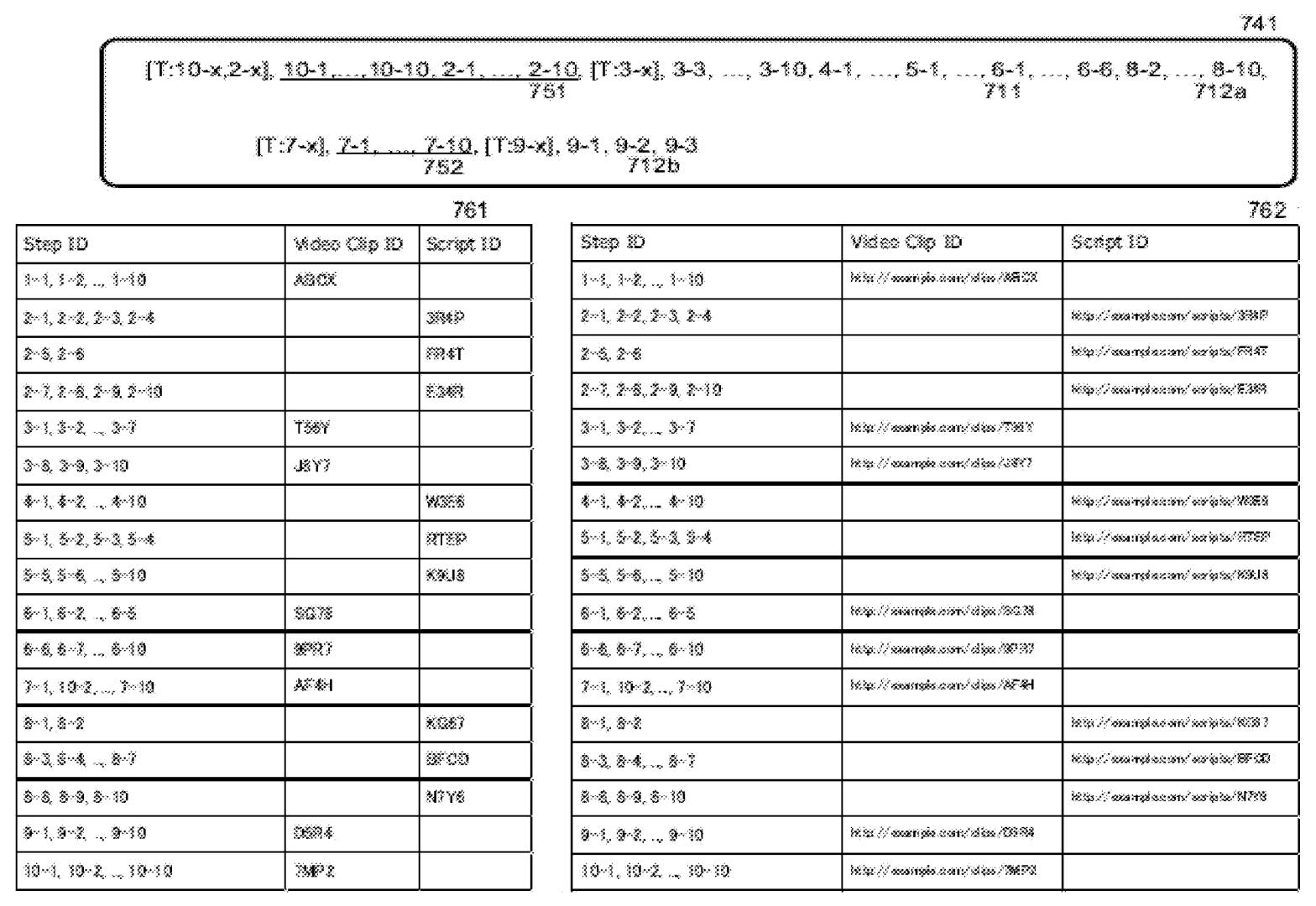

FIG. 7B shows an example in which the video clips associated with user-selected items and dependent items in step ID list (741) are identified in an embodiment of the present invention. This embodiment is different from the one shown in FIG. 3B and FIG. 6B.

The electronic device may identify the video clips associated with each item in the step ID list (741) using video clip identifying table (761) or video clip identifying table (762).

The electronic device uses the video clip identifying table (761) to acquire the video clip ID or script ID associated with the step ID corresponding to a step number in the step ID list (741), and associates the acquired video clip ID or script ID with the step in the step ID list (741). The electronic device can dynamically create a provisional video by linking the associated video clips or scripts.

Similarly, the electronic device uses the video clip identifying table (762) to acquire the video clip ID or script ID associated with the step ID corresponding to a step number in the step ID list (741), and associates the acquired video clip ID or script ID with the step in the step ID list (741). The electronic device can dynamically create a provisional video by linking the associated video clips or scripts.

Figure 7C:
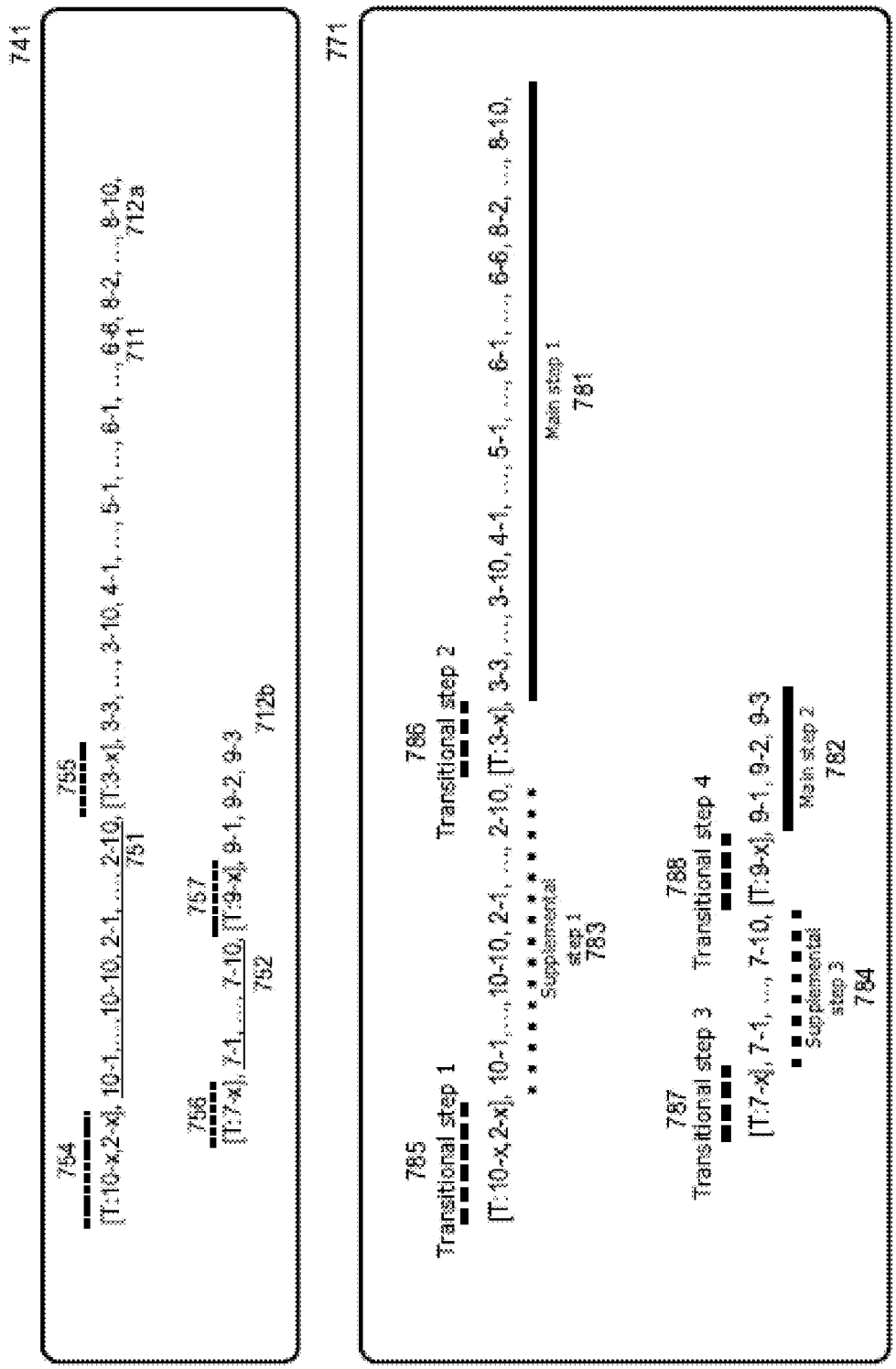
FIG. 7C shows an example of video clips in a video classified according to different categories ("main step", "transitional step" and "supplemental step") according to an embodiment of the present invention different from the embodiment shown in FIG. 3C.

FIG. 7C shows an example in which the video clips in a video are classified by category ("main step", "transitional step", supplemental step"). This embodiment is different from the one shown in FIG. 3C.

The step ID list (741) shown in FIG. 7C is the same step ID list (741) shown in FIG. 7B, and has Step 10-1 through Step 10-10 and Step 2-1 through Step 2-10 (751), Step 7-1 through Step 7-10 (752), Step 3-3 through Step 6-6 (711), (753), and Step 8-2 through Step 9-3 (712). Video clips are associated with each step using the process shown in FIG. 7B.

The electronic device sets the category of the video clips associated with items in the step ID list (741) identified by the user (Step 3-3 through Step 6-6 (711), Step 8-2 through Step 8-10 (712*a*), and Step 9-1 through Step 9-3 (712*b*)) to "main step".

The electronic device sets the category of the video clips associated in the step ID list (741) with dependent items identified as having a dependent relationship with user-specified items (Step 10-1 through Step 10-10 and Step 2-1 through Step 2-10 (751), and Step 7-1 through Step 7-10 (752)) to "supplemental step".

The electronic device sets the category of the video clips associated with the transitional step inserted before and after a dependent item in the step ID list (741) (that is, transitional step (754) and then transitional step (755) inserted before the steps composed of Step 10-1 through Step 10-10 and Step 2-1 through Step 2-10, and transitional step (756) and then transitional step (757) inserted before Step 7-1 through Step 7-10) to "transitional step". A transitional step is a portion corresponding to a scene change.

In the categorized track (771), the video clips associated with each item in the categorized track (771) were categorized as follows: transitional step 1 (785), supplemental step 1 (783), transitional step 2 (786), main step 1 (781), transitional step 3 (787), supplemental step 3 (784), transitional step 4 (788), and main step 2 (782).

As in the case of FIG. 5A, a video clip is associated with transitional step 1 (785), supplemental step 1 (783), transitional step 2 (786), main step 1 (781), transitional step 3 (787), supplemental step 3 (784), transitional step 4 (788), and main step 2 (782) in the categorized track (771). Therefore, the electronic device can dynamically create a video by linking together transitional step 1 (785), supplemental step 1 (783), transitional step 2 (786), main step 1 (781), transitional step 3 (787), supplemental step 3 (784), transitional step 4 (788), and main step 2 (782). When the electronic device is a user terminal, the electronic device may play back the created video.

By setting each video clip according to category ("main step", "transitional step", "supplemental step"), a video can be played back in different ways by category. The following are examples of playback by category.

Figure 8:
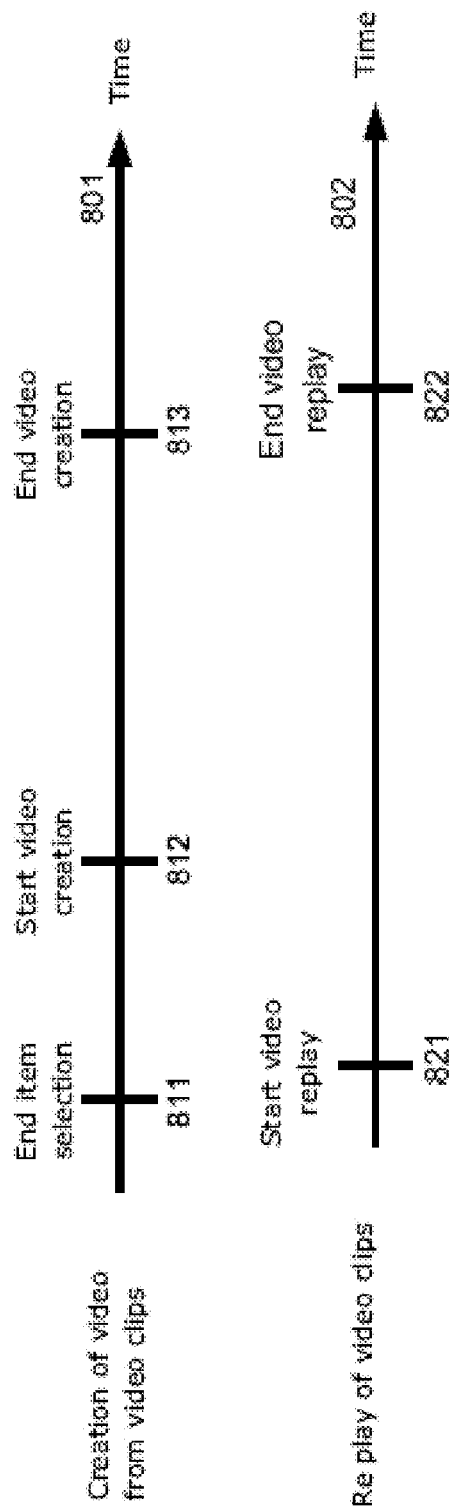
FIG. 8 shows the timing for the process of creating a video from video clips (the video clip consolidation process) and the process of playing back the video clips in the video.

FIG. 8 shows the timing for the process of creating a video from video clips (the video clip consolidation process) and the process of playing back the video clips in the video.

When the user has finished selecting items (811), the electronic device responds by starting the creation of a video (812). In response to having started to create a video (812), the electronic device begins playing back the created video (821) before ending the creation of the video (813). In other words, the electronic device creates a video and plays back the video in parallel.

FIG. 9A through FIG. 9F shows an example of a flowchart of the process for dynamically creating a video on the basis of a structured document. In the following explanation, the main unit (electronic device) performing each step shown in FIG. 9A through FIG. 9F depends on whether the electronic device is a user terminal or the electronic device is a server.

FIG. 9A shows an example of a flowchart of the entire process performed to dynamically create a video on the basis of a structured document in an embodiment of the present invention.

When the electronic device is a user terminal

In Step 901, the user terminal starts the process of dynamically creating a video on the basis of a structured document.

In Step 902, the user terminal retrieves an electronic manual from memory (103, 123) in response to a user request, and displays the retrieved electronic manual on the display device (106, 126) of the user terminal. The user terminal may display the electronic document on the left side of the application window or in a different application window.

In Step 903, the user terminal switches to the selection screen for selecting one or more items from the electronic manual in response to the user having clicked on the "switch to selection screen" button. The user then selects one or more items in the selection screen. The user terminal identifies the items selected by the user as input, and uses a dependent item identifying table (321, 621 or 721) to identify at least one dependent item having a dependency relationship with an identified item. The user terminal then outputs the user-selected items and the dependent items as a step ID list. Step 903 is described in greater detail in FIG. 9B through FIG. 9D.

In Step 904, the user terminal uses a video clip identifying table (361, 362, 661, 662, 761 or 762) to select at least one video clip associated with each item in the step ID list created in Step 903, and outputs the video clips as a track. Step 904 is described in greater detail in FIG. 9E.

In Step 905, the user terminal creates a video from the track created in Step 904. Step 905 is described in greater detail in FIG. 9F.

In Step 906, the user terminal may provide a video or information for playing back a video to the user.

In Step 907, the user terminal may optionally output the video clips in the video from a storage device (108, 109, 128) in response to a video creation instruction from the user or may download the video clips in the video via a network (115, 135). In other words, the video clips in the video may be retrieved by the user terminal from memory (103, 123). The user terminal then successively plays back the video retrieved from memory (103, 123) on the display device (106, 126) of the user terminal.

In Step 908, the user terminal ends the process of dynamically creating a video on the basis of a structured document.

When the electronic device is a server.

In Step 901, the user terminal starts the process of dynamically creating a video on the basis of a structured document.

In Step 902, the user terminal retrieves an electronic manual from memory (103, 123) in response to a user request, and displays the retrieved electronic manual on the display device (106, 126) of the user terminal.

In Step 903, the user terminal switches to the selection screen for selecting one or more items from the electronic manual in response to the user having clicked on the "switch to selection screen" button. The user then selects one or more items in the selection screen. The user terminal identifies the items selected by the user as input, and uses a dependent item identifying table (321, 621 or 721) to identify at least one dependent item having a dependency relationship with an identified item. The user terminal then sends the information on the user-selected items and identified dependent items to a server connected to the user terminal via a network. Alternatively, the user terminal may identify the user-selected items and send information on the identified items to a server connected to the user terminal via a network. The server receives the user-selected items and the identified dependent items from the user terminal. Alternatively, the server receives information on the user-selected items from the user terminal and uses a dependent item identifying table (321, 621 or 721) to identify at least one dependent item having a dependency relationship with a user-selected item in the received information. The server then outputs the user-selected items and the dependent items as a step ID list. Step 903 is described in greater detail in FIG. 9B through FIG. 9D.

In Step 904, the server uses a video clip identifying table (361, 362, 661, 662, 761 or 762) to select at least one video clip associated with each item in the step ID list created in Step 903, and outputs the video clips as a track. Step 904 is described in greater detail in FIG. 9E.

In Step 905, the server creates a video from the track created in Step 904. Step 905 is described in greater detail in FIG. 9F.

In Step 906, the server sends to the user terminal video data for the video created in Step 905 or information on playing back the video (for example, information indicating the location where the video data is being stored such as a URL, URI or file name).

In Step 907, the user terminal may optionally receive video data or information on playing back the video data from the server in response to a video creation instruction from the user. When the user terminal receives the video data, the user terminal retrieves the received video from a storage device (108, 109, 128), and stores the video clips in the video in memory (103, 123). When the user terminal receives information on playing back the video data, the user terminal downloads the video data via the network (115, 135), retrieves the downloaded video from the storage device (108, 109, 128), and stores the video clips in the video in memory (103, 123). The user terminal then successively plays back the retrieved video in memory (103, 123) on the display device (106, 126) of the user terminal.

In Step 908, the user terminal ends the process of dynamically creating a video on the basis of a structured document.

FIG. 9B shows an example of a flowchart for creating a step ID list in the process of dynamically creating a video on the basis of a structured document according to an embodiment of the present invention.

When the electronic device is a user terminal

In Step 911, the user terminal begins the processing in Step 903 shown in FIG. 9A, that is, to acquire user-selected items and create a step ID list.

In Step 912, the user terminal initializes a step ID list in order to create a step ID list. For example, the user terminal may initialize a storage device (such as a buffer) in order to store a step ID list. The step ID list in the flowchart is a global variable referenced in all of the recursive steps performed to identify step IDs (see FIG. 9C through FIG. 9D).

In Step 913, the user terminal resolves the dependent items of each user-selected item, and creates a step ID list. In Step 913, the step ID list is retrieved as an initialized global variable, and is outputted as a step ID list updated in a format including step IDs with dependency flags affixed to indicate a dependent step. Step 913 is described in greater detail in FIG. 9C.

In Step 914, the user terminal scans the step ID list with affixed dependency flags in order from the top, determines the locations at which transitional steps need to be inserted into the step ID, and inserts transitional steps at these locations. In Step 914, the transitional step insertion process is treated as a sub-routine, and the step ID list outputted in Step 913 is updated. Step 914 is described in greater detail in FIG. 9D.

In Step 915, the user terminal outputs the step ID list.

In Step 916, the user terminal ends the process in Step 903 shown in FIG. 9A.

When the electronic device is a server

The processing performed in Step 911 through Step 916 when the electronic device is a server is the same as the processing performed in Step 911 through Step 916 when the electronic device is a user terminal. Therefore, the main unit (user terminal) performing the processing in Step 911 through Step 916 is simply replaced by a server.

FIG. 9C shows an example of a flowchart for the process of resolving dependent items and creating a step ID list in the flowchart for creating a step ID list shown in FIG. 9B.

When the electronic device is a user terminal

In Step 921, the user terminal begins to perform the processing in Step 913 shown in FIG. 9B, that is, to resolve the dependent items and create a step ID list.

In Step 922, the user terminal retrieves unprocessed user-selected items in order from the most recent number, and acquires the step ID of the retrieved items.

In Step 923, the user terminal determines whether or not certain conditions have been met, namely, whether the item retrieved in Step 922 has a dependent item and whether the dependency relationship of the task ID belonging to the step ID of the retrieved item is unresolved. When Step 3-$x$ (corresponding to the step ID) is dependent on Step 2-$x$ as shown in the dependent item identifying table (721) in FIG. 7A, Step 3-3 in the step ID list (701) is processed. After inserting Step 2-$x$ in the step ID list, Step 3-4 is evaluated. In order to insert Step 2-3 once again, the dependency relationship to a step belonging to the same task ID such as Step 3-$x$ has to be resolved. Therefore, a step belonging to the same task ID is not reevaluated. When the conditions have been met, the user terminal proceeds to Step 924. When the conditions have not been met, the user terminal proceeds to Step 926.

When the conditions have been met as determined by Step 923, the user terminal in Step 924 enters the dependent item of the retrieved item as input, and recursively calls and executes the processing shown in FIG. 9C to further update the step ID list. In other words, when it has been determined that there is an item dependent on a dependent item of the retrieved item and that the item is further dependent, the user terminal may add the item that is even further dependent and update the step ID list. Therefore, a recursive structure is employed in Step 924. In this way, the user terminal is able to resolve items dependent even further on user-selected items.

In Step 925, the user terminal affixes a dependency flag to the step ID newly added to the step ID list. In Step 924, when Step 924 is recursively called and Step 924 is executed again, the step ID of the dependent item is added to the step ID list serving as a global variable (this is referred to in FIG. 10A as the "global list"). However, when the added step ID is for a dependent item, it has to be differentiated. In order to differentiate an added step ID for a dependent item, the user terminal compares the lists before and after the processing in Step 924 was performed, and affixes a flag indicating a dependent item to the newly inserted item.

In Step 926, the user terminal inserts the step ID corresponding to the item determined in Step 923 into the step ID list when the conditions in Step 923 are not met.

In Step 927, the user terminal determines whether there are any unprocessed items. When an unprocessed item is present, the user terminal returns to Step 922. When an unprocessed item is not present, the user terminal proceeds to Step 928 in which the process is ended.

In Step 928, the user terminal ends the processing in Step 913 of FIG. 9B. Next, the user terminal inserts the step ID to which a dependency flag was affixed in Step 925, determines the insertion location in the step ID list for the transitional step used to insert the step ID to which a dependency flag was affixed in Step 926. The user terminal then starts processing performed in accordance with the flowchart in FIG. 9D in order to insert a transitional step into the determined insertion location.

When the electronic device is a server

The processing performed in Step 921 through Step 928 when the electronic device is a server is the same as the processing performed in Step 921 through Step 928 when the electronic device is a user terminal. Therefore, the main unit (user terminal) performing the processing in Step 921 through Step 928 is simply replaced by a server.

FIG. 9D shows an example of a flowchart for the process of determining the insertion locations for transitional steps in the step ID list created in accordance with the processing shown in the flowchart of FIG. 9C and inserting the transitional steps in the flowchart for creating a step ID list shown in FIG. 9B.

When the electronic device is a user terminal

In Step 931, the user terminal begins to perform the processing in Step 914 shown in FIG. 9B, that is, to determine the insertion location of transitional steps and insert the transitional steps.

In Step 932, the user terminal initializes a start insertion location, which is a variable for storing the location of a dependent step when a step ID without an affixed dependency flag is retrieved. For example, the user terminal may initialize a storage device (such as a buffer) for storing a "start insertion location" variable. Because the "start insertion location" is set to the initial state or another value, it can be used to determine whether or not a string of dependent steps is to be started.

In Step 933, the user terminal retrieves an unprocessed step ID from the step ID list outputted by the processing performed according to the flowchart in FIG. 9C, for example, in the order of arrangement.

In Step 934, the user terminal determines whether or not the step ID retrieved in Step 933 is for a dependent step. When the step ID is for a dependent step, the user terminal proceeds to Step 935. When the step ID is not for a dependent step, the user terminal proceeds to Step 937.

When the step ID retrieved in Step 933 is for a dependent step, the user terminal determines in Step 935 whether or not the "start insertion location" variable is in the initial state.

When the "start insertion location" variable is in the initial state, the user terminal proceeds to Step 936. When the "start insertion location" variable is not in the initial state, the user terminal proceeds to Step 941.

Because the "start insertion location" variable is in the initial state, the user terminal in Step 936 determines that the position just before the step ID retrieved in Step 933 is the start insertion location.

When the step ID retrieved in Step 933 is not for a dependent step, the user terminal in Step 937 determines that the "start insertion location" variable is not in the initial state. Because the "start insertion location" variable is not in the initial state, the user terminal proceeds to Step 938. When the "start insertion location" variable is in the initial state, the user terminal proceeds to Step 941.

When the "start insertion location" variable is not in the initial state, the user terminal in Step 938 creates a new transitional step, affixes information in the ID list from the "start insertion location" variable to just before the step ID, and inserts a new transition step in the "start insertion location" variable. In other words, the user terminal adds information on the step ID which is passed on to Step 938 when a new transitional step is inserted into the start insertion location.

In Step 939, the user terminal creates a new transitional step, affixes step ID information, and inserts the new transitional step just before the step ID. In other words, the user terminal adds the step ID information retrieved in Step 933 when a new transitional step is to be inserted in an end position.

In Step 940, the user terminal initializes the "start insert location" variable.

In Step 941, the user terminal determines whether or not there is an unprocessed step ID in the step ID list outputted by the processing performed in accordance with the flowchart in FIG. 9C. The user terminal returns to Step 933 when an unprocessed step ID is found. The user terminal proceeds to Step 942, which ends the processing, when an unprocessed step ID is not found.

In Step 942, the user terminal ends the processing in Step 914 of FIG. 9B.

When the electronic device is a server

The processing performed in Step 931 through Step 942 when the electronic device is a server is the same as the processing performed in Step 931 through Step 942 when the electronic device is a user terminal. Therefore, the main unit (user terminal) performing the processing in Step 931 through Step 942 is simply replaced by a server.

Figure 9E:
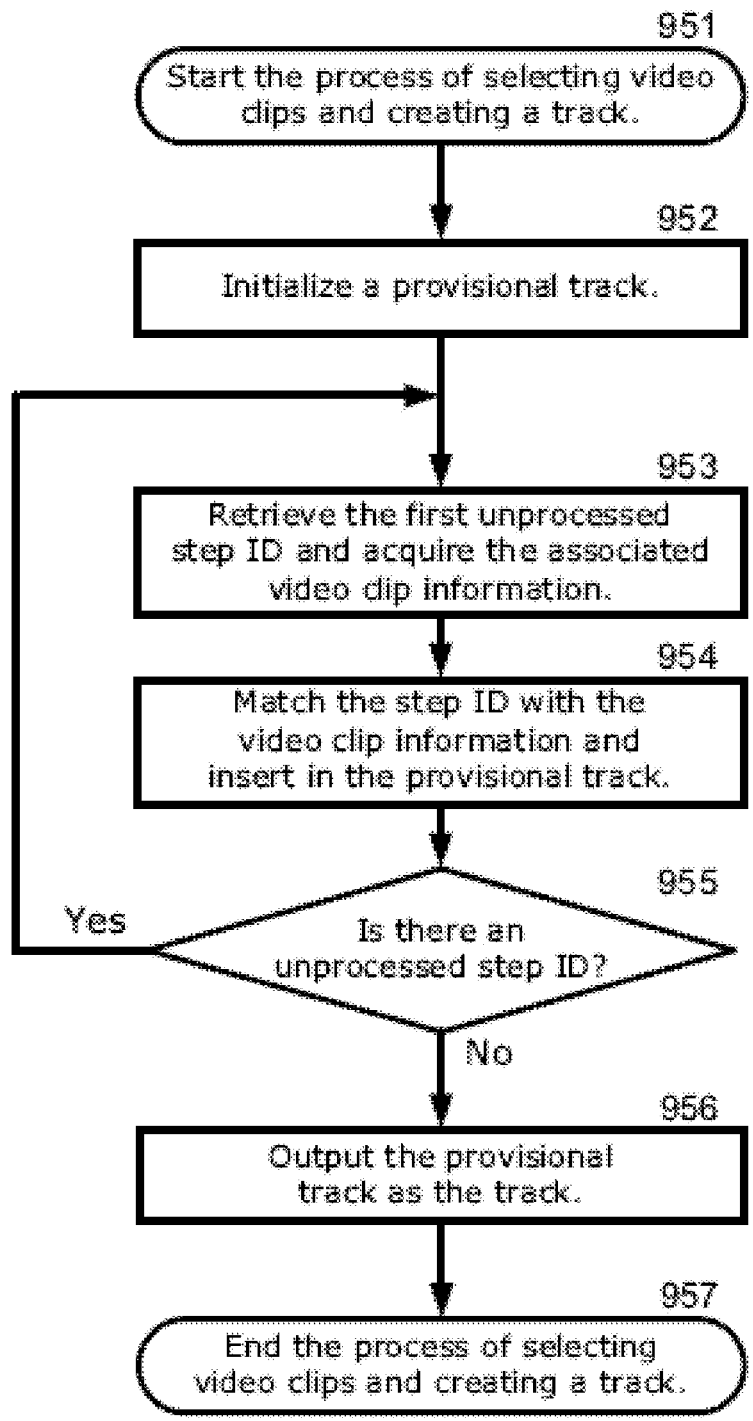
FIG. 9E shows an example of a flowchart for selecting video clips and creating a track in the process of dynamically creating a video on the basis of a structured document according to an embodiment of the present invention.

FIG. 9E shows an example of a flowchart for selecting video clips and creating a track in the process of dynamically creating a video on the basis of a structured document according to an embodiment of the present invention.

When the electronic device is a user terminal

In Step 951, the user terminal begins to perform the processing in Step 904 shown in FIG. 9A, that is, to select video clips and create a track.

In Step 952, the user terminal initializes a provisional track in order to create a track. For example, the user terminal may initialize a storage device (such as a buffer) to store a provisional track.

In Step 953, the user terminal retrieves the first unprocessed step ID in the step ID list created in Step 903, and acquires video clip information associated with the retrieved step ID. When, for example, the step ID is for a main step or a supplemental step, the user terminal extracts information on the corresponding clip from the video clip identifying table, and affixes the information on the extracted video clip to the item (data linking the step ID list to attributes of a main step, supplemental step or transitional step). As a result of appending video clip information, three data sets are affixed to the item: a step ID, attributes of the main step, supplemental step or transitional step, and video clip information.

In Step 954, the user terminal inserts in the provisional track the step ID retrieved in Step 953 combined with information acquired in Step 953 (video clip information).

In Step 955, the user terminal determines whether or not an unprocessed step ID is present in the step ID list created in Step 903. When an unprocessed step ID is present, the user terminal returns to Step 953. When an unprocessed step ID is not present, the user terminal proceeds to Step 956.

In Step 956, the user terminal outputs the provisional track as the track when no unprocessed step IDs are present.

In Step 957, the user terminal ends the processing performed in Step 904 of FIG. 9A.

When the electronic device is a server

The processing performed in Step 951 through Step 957 when the electronic device is a server is the same as the processing performed in Step 951 through Step 957 when the electronic device is a user terminal. Therefore, the main unit (user terminal) performing the processing in Step 951 through Step 957 is simply replaced by a server.

Figure 9F:
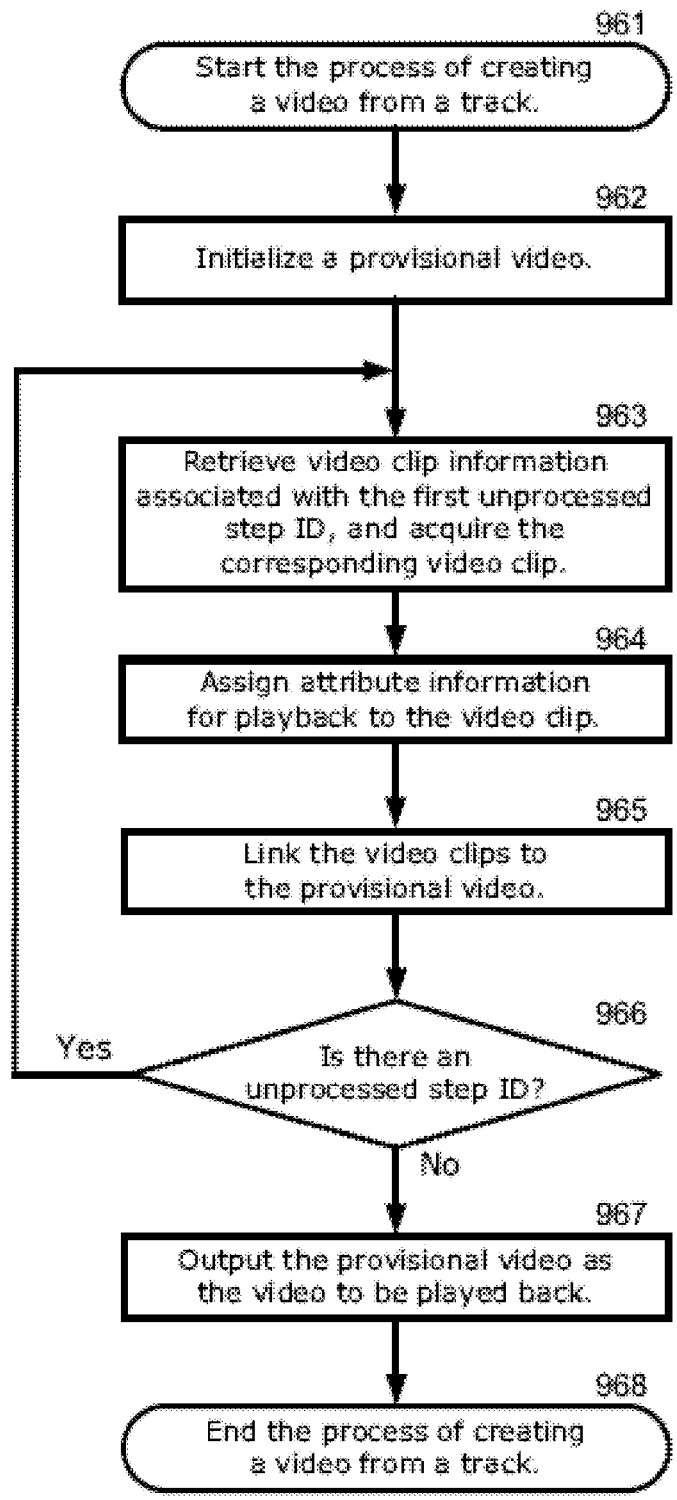
FIG. 9F shows an example of a flowchart for creating a video from a track in the process of dynamically creating a video on the basis of a structured document according to an embodiment of the present invention.

FIG. 9F shows an example of a flowchart for creating a video from a track in the process of dynamically creating a video on the basis of a structured document according to an embodiment of the present invention.

When the electronic device is a user terminal

In Step 961, the user terminal begins to perform the processing in Step 905 shown in FIG. 9A, that is, to create a video from the track.

In Step 962, the user terminal initializes a provisional video in order to create a video. For example, the user terminal may initialize a storage device (such as a buffer) to store a provisional video.

In Step 963, the user terminal retrieves video clip information associated with the first unprocessed step ID in the track created in Step 904, and acquires a video clip corresponding to the video clip information.

In Step 964, the user terminal affixes attribute information for playing back each video clip. For example, data is affixed to each step ID in the track indicating whether or not the item was selected by the user as described in the explanation of Step 953. As a result, the user terminal may affix this as attribute information on the video clip corresponding to the data (for example, this is a main step selected by the user).

In Step 965, the video terminal consolidates the video clips in the provisional video.

In Step 966, the user terminal determines whether or not there is an unprocessed step ID in the track created in Step 904. When an unprocessed step ID is present, the user terminal returns to Step 963. When an unprocessed step ID is not present, the user terminal proceeds to Step 967.

In Step 967, when an unprocessed step ID is not present, the user terminal outputs the provisional video to the storage device (108, 128) as the video to be played. Alternatively, when an unprocessed step ID is not present, the user terminal may output information for playing back video from the provisional video to the storage device (108, 128).

In Step 968, the user terminal ends the processing performed in Step 905 of FIG. 9A.

When the electronic device is a server

The processing performed in Step 961 through Step 968 when the electronic device is a server is the same as the processing performed in Step 961 through Step 968 when the electronic device is a user terminal. Therefore, the main unit (user terminal) performing the processing in Step 961 through Step 968 is simply replaced by a server.

Figure 10A:
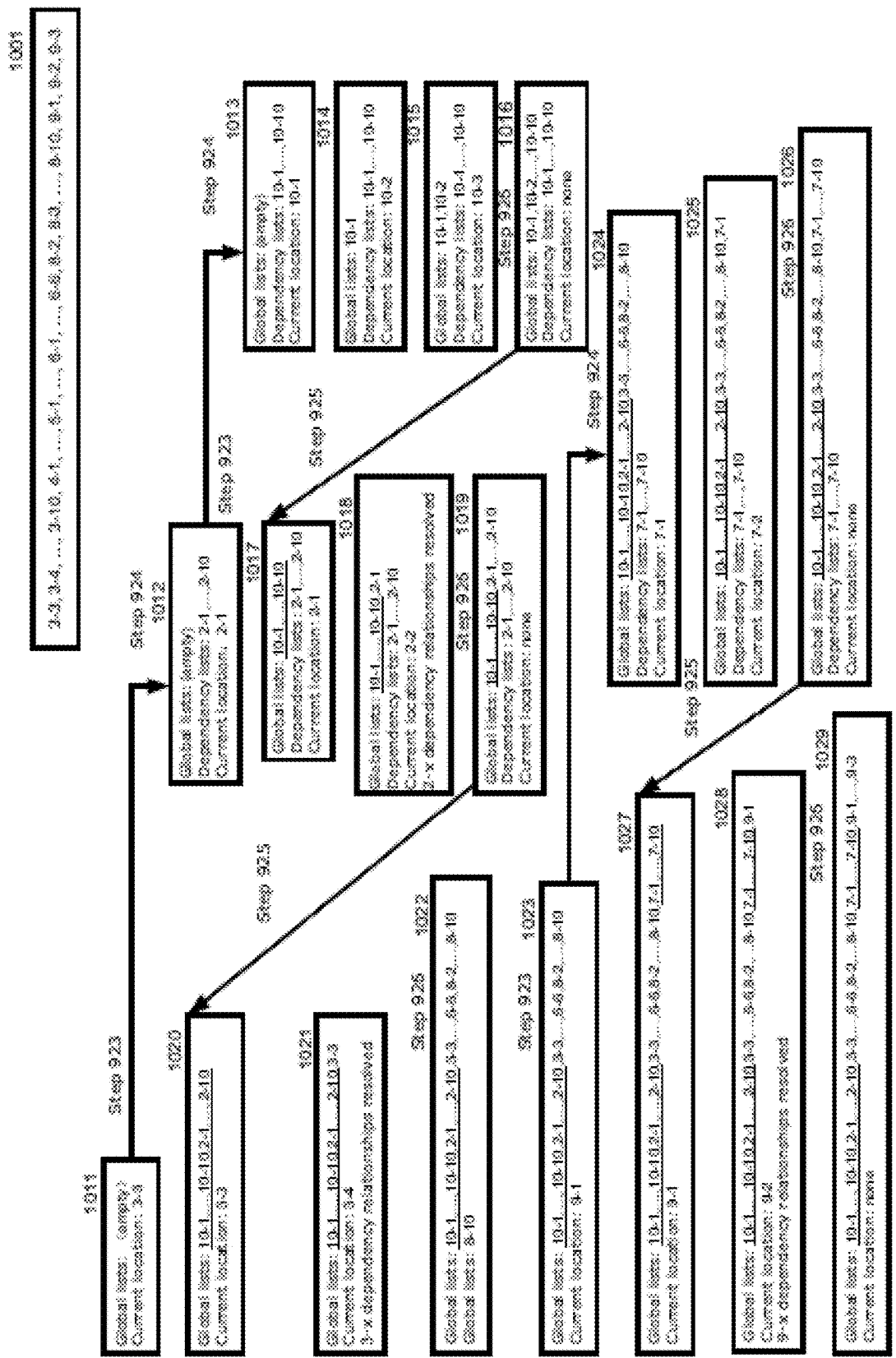
FIG. 10A shows a step ID list that has been consolidated according to the processing shown in the flowchart of FIG. 9C.

FIG. 10A shows a step ID list that has been consolidated according to the processing shown in the flowchart of FIG. 9C.

In the step ID list (1001) shown in FIG. 10A, each item selected by the user in FIG. 2C through FIG. 2D, that is, Step 3-3 through Step 6-6 (311) and Step 8-2 through Step 9-3 (312) are linked.

The electronic device performs processing in accordance with the flowchart in FIG. 9C on the step ID list (1001) in order to resolve the dependent items created in accordance with the flowchart in FIG. 9C, and create a step ID list. Step ID list (1011) through step ID list (1029) indicate what changes have occurred in the global variables in the creation of the list. Step 923, Step 924, Step 925, Step 926 and Step 927 correspond to the step numbers shown in FIG. 9C.

For example, the change from "10-1, . . . , 10-10, 2-1, . . . , 2-10" in step ID list (1019) to "10-1, . . . , 10-10, 2-1, . . . , 2-10" in step ID list (1020), when viewed from the top of the recursive process (that is, the flow in which Step 3-3 is processed), means dependency flags have been affixed to all items in "10-1, . . . , 10-10, 2-1, . . . , 2-10" of step ID (1019) to become newly added items (steps). The items already including affixed dependency flags keep their affixed dependency flags.

Figure 10B:
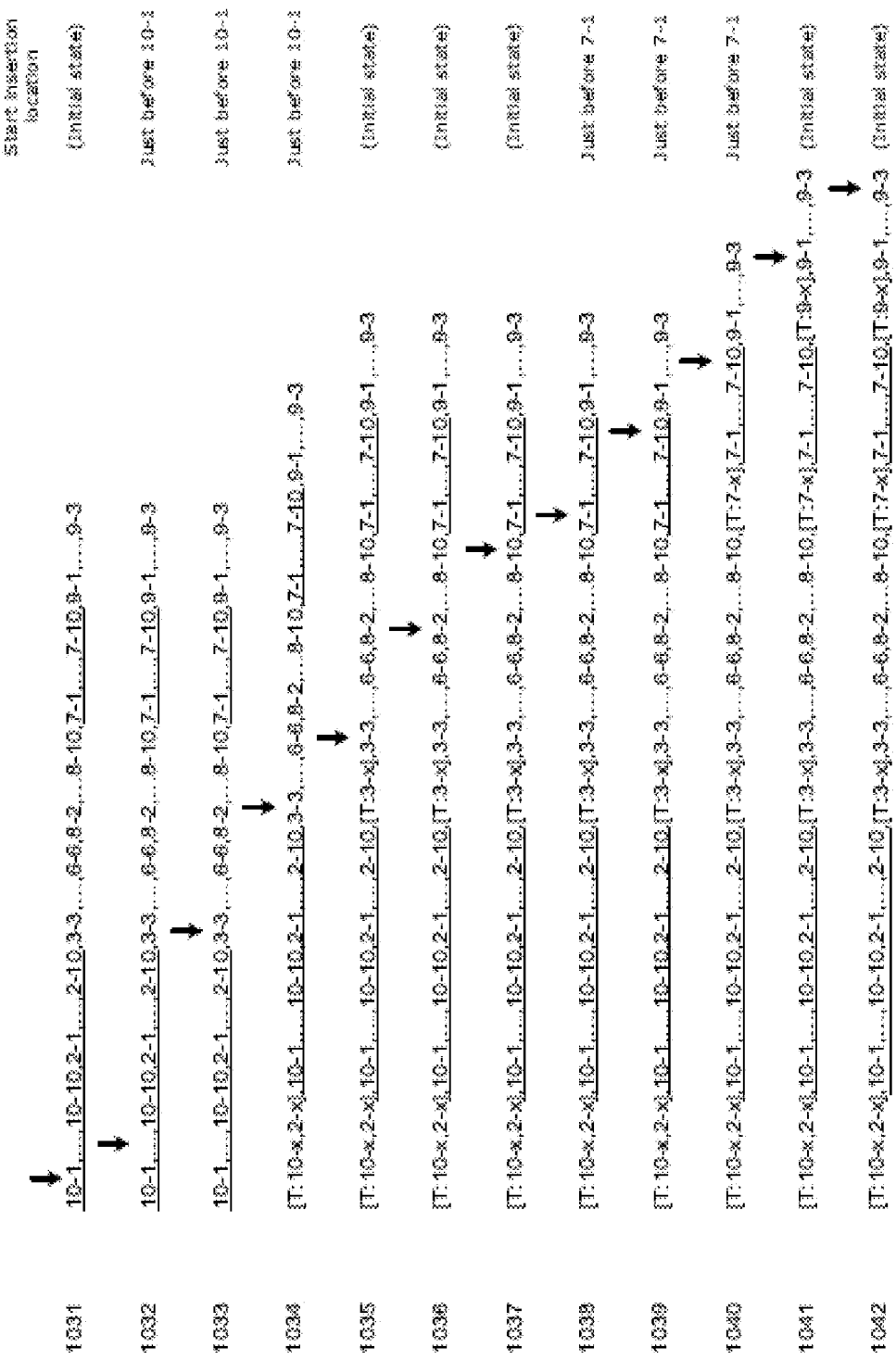
FIG. 10B shows the insertion of transitional steps into a step ID list (1029) with all dependencies resolved according to the processing shown in the flowchart of FIG. 9D.

FIG. 10B shows the insertion of transitional steps into a step ID list (1029) with all dependencies resolved according to the processing shown in the flowchart of FIG. 9D.

The step ID list (1031) shown in FIG. 10B is the same as the step ID list (1029) shown in FIG. 10A.

Step ID list (1031) through step ID list (1042) show how transitional steps are inserted into step ID list (1031) in accordance with the process shown in the flowchart of FIG. 9D. The down arrows "↓" in step ID list (1031) through step ID list (1042) are cursors showing the step ID retrieved in Step 933 of the flowchart shown in FIG. 9D. The electronic device includes two combinations of the position of the downward arrow "↓" and a "start insertion location" variable to determine the start position and end position of a string of dependent steps, and inserts transitional step [T: 10-*x*, 2-*x*] (1034), transitional step [T:3-*x*] (1035), transitional step [T:7-*x*] (1040) and transitional step [T:9-*x*] (1041) into the step ID list (1031) in sequential order.

Figure 11A:
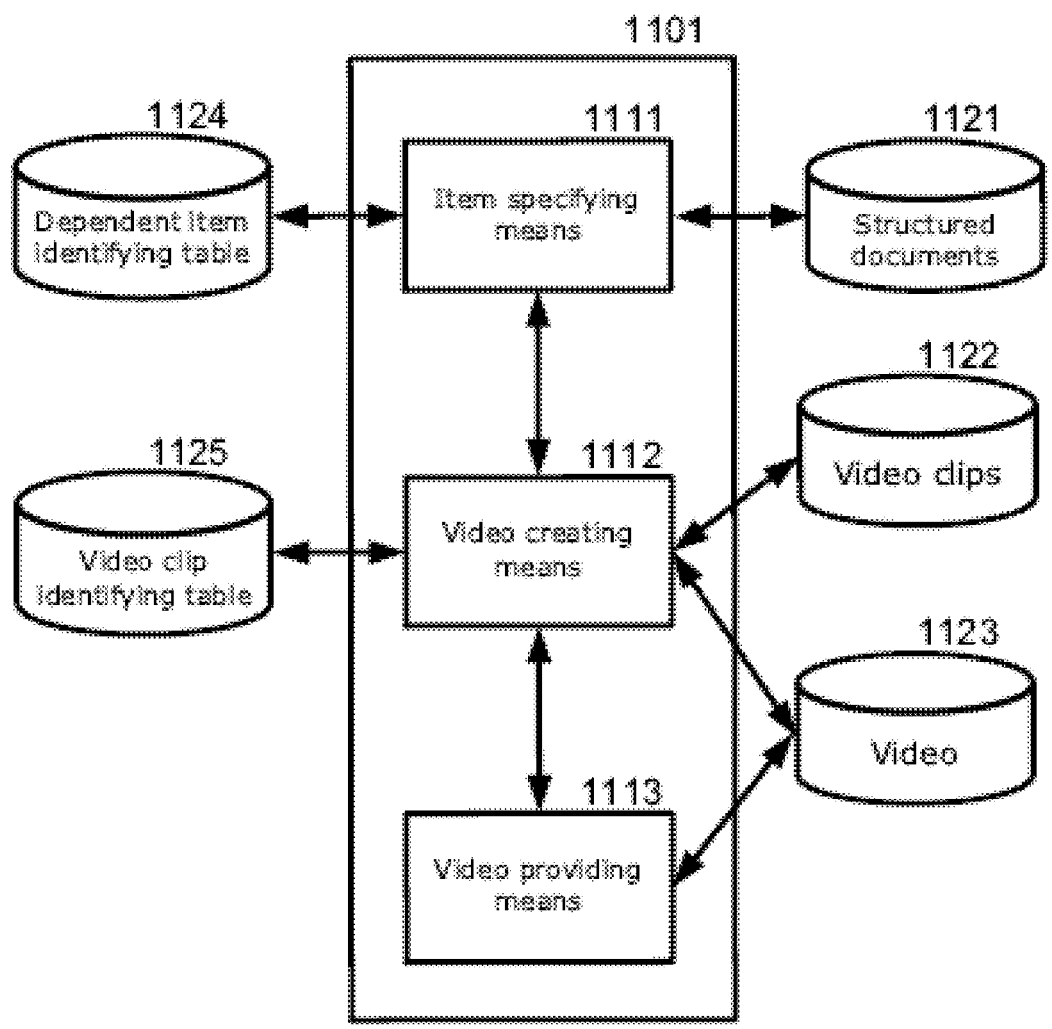
FIG. 11A is a functional block diagram of an electronic device preferably including a hardware configuration according to FIG. 1 for dynamically creating video on the basis of a structured document in accordance with an embodiment of the present invention in which the electronic device is a user terminal.

FIG. 11A is a functional block diagram of an electronic device preferably including a hardware configuration according to FIG. 1 for dynamically creating video on the basis of a structured document in accordance with an embodiment of the present invention in which the electronic device is a user terminal.

The user terminal (1101) includes an item identifying means (1111), a video creating means (1112) and a video providing means (1113).

The item identifying means (1111) identifies at least one item in the structured document (1121) selected by the user, and at least one dependent item having a dependency relationship with the user-selected item. For example, the item identifying means (1111) may use the dependent item identifying table (1124) to identify dependent items.

Also, the item identifying means (1111) identifies at least one combination of a user-selected item in a start position (a first item) and a user-selected item in an end position (a second item), and identifies each item (third items) between the first item and the second item.

Also, the item identifying means (1111) determines whether or not there is any dependent item which is dependent on the first item, the second item or a third item. When a dependent item is present, the dependent item is identified.

The video creating means (1112) dynamically creates a video (1123) based on at least one video clip (1122) associated with each of the items identified by the item identifying means (1111) and at least one video clip (1122) associated with each dependent item identified by the item identifying means (1111).

The video creating means (1112) sorts the first item, the second item and the third items in the order of the items (for example, the numerical order of the items, or the numerical order of items in accordance with an order suitable for playing back video clips associated with the items), and dynamically creates a video (1123) in the order of the items on the basis of the video clips (1122) associated with the first item, the second item and the third items.

Also, the video creating means (1112) sorts the first item, the second item and third items and dependent items in the order of the items (for example, the numerical order of the items, or the numerical order of items in accordance with an order suitable for playing back video clips associated with the items), and dynamically creates a video (1123) in the order of the items on the basis of the video clips (1122) associated with the first item, the second item, the third items and the dependent items.

Also, the video creating means (1112) inserts supplemental video clips (1122) used to explain the next video clip (1122) to be presented to the user between a video clip (1122) associated with a first item, a second item or a third item, and a video clip (1122) associated with the dependent item directly adjacent to the first item, second item or third item (that is, the dependent item just before or just after the item).

In addition, the video creating means (1112) affixes a first flag used to play back video clips (1122) associated with the first item, second item and third items according to a first attribute to the playback information for each video clip (1122) associated with the first item, second item and third items, and affixes a second flag used to play back video clips (1122) associated with dependent items according to a second attribute other than the first attribute to the playback information for each video clip (1122) associated with a dependent item. The first attribute and the second attribute can be any attribute selected from among video clip (1122) playback time, video clip (1122) playback speed, an indicator denoting whether or not to play back the video clip (1122), and the size of the playback window for the video clip (1122).

The video creating means (1112) also determines whether or not there is an operation script associated with an identified item and/or dependent item, and dynamically creates a video (1123), when an operation script is present, according to virtual execution screens executed by the script using video clips (1122) associated with items by the operation script.

Also, the video creating means (1112) uses the video clip identifying table (1175) to select video clips (1122) associated with items and dependent items identified by the item identifying means (1111).

The video providing means (1113) may play back the video (1123) created by the video creating means (1112) or may download video clips (1122) in accordance with information on playing back the video (for example, information indicating the location where the video data is being stored such as a URL, URI or file name) and playing back the video.

Figure 11B:
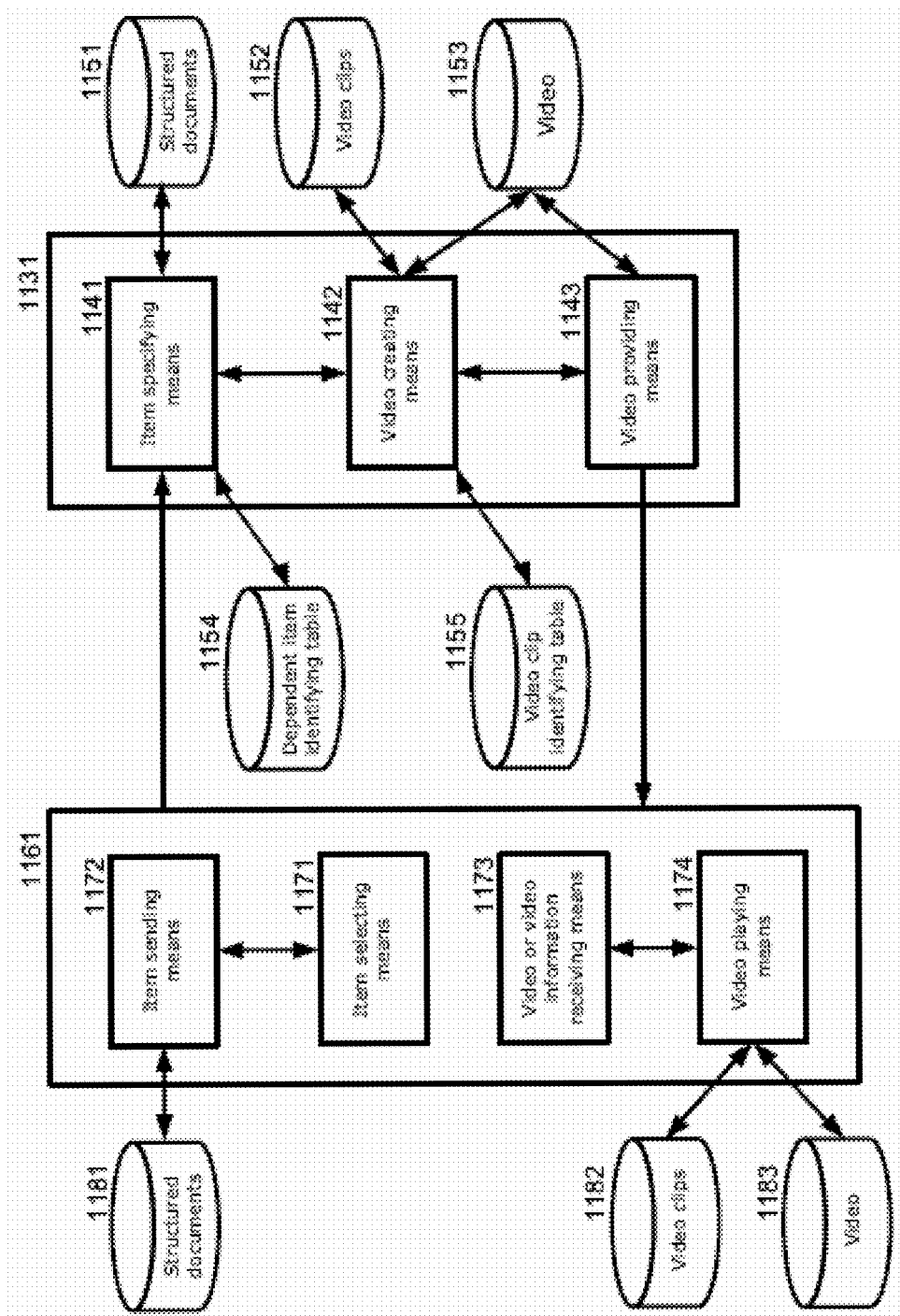
FIG. 11B is a functional block diagram of an electronic device preferably including a hardware configuration according to FIG. 1 for dynamically creating video on the basis of a structured document in accordance with an embodiment of the present invention in which the electronic device is a server connected to a user terminal.

FIG. 11B is a functional block diagram of an electronic device preferably including a hardware configuration according to FIG. 1 for dynamically creating video on the basis of a structured document in accordance with an embodiment of the present invention in which the electronic device is a server connected to a user terminal.

The server (1131) is connected to a user terminal (1161) via a network (the internet or an intranet).

The server (1131) includes an item identifying means (1141), a video creating means (1142) and a video providing means (1143).

The user terminal (1161) includes an item selecting means (1171), and item sending means (1172), a video or video information receiving means (1173), and a video playing means (1174).

The item selecting means (1171) in the user terminal (1161) allows the user to select at least one item from the structured document (1181).

The item sending means (1172) in the user terminal (1161) sends user-selected items to the server (1131).

The item identifying means (1141) in the server (1131) receives the user-selected items sent by the item sending means (1172), and identifies the items selected by the user in the structured document (1151, which is the same as structured document (1181) or a copy).

The item identifying means (1141) also identifies at least one dependent item having a dependency relationship to a user-specified item. For example, the item identifying means (1141) may use the dependent item identifying table (1154) to identify dependent items.

Also, the item identifying means (1141) identifies at least one combination of a user-selected item in a start position (a first item) and a user-selected item in an end position (a second item), and identifies each item (third items) between the first item and the second item.

Also, the item identifying means (1141) determines whether or not there is any dependent item which is dependent on the first item, the second item or a third item. When a dependent item is present, the dependent item is identified.

The video creating means (1142) in the server sorts the first item, the second item and the third items in the order of the items (for example, the numerical order of the items, or the numerical order of items in accordance with an order suitable for playing back video clips associated with the items), and dynamically creates a video (1153) in the order of the items on the basis of the video clips (1152) associated with the first item, the second item and the third items.

Also, the video creating means (1142) sorts the first item, the second item and third items and dependent items in the order of the items (for example, the numerical order of the items, or the numerical order of items in accordance with an order suitable for playing back video clips associated with the items), and dynamically creates a video (1153) in the order of the items on the basis of the video clips (1152) associated with the first item, the second item, the third items and the dependent items.

Also, the video creating means (1142) inserts supplemental video clips (1152) used to explain the next video clip (1152) to be presented to the user between a video clip (1152) associated with a first item, a second item or a third item, and a video clip (1152) associated with the dependent item directly adjacent to the first item, second item or third item (that is, the dependent item just before or just after the item).

In addition, the video creating means (1142) affixes a first flag used to play back video clips (1152) associated with the first item, second item and third items according to a first attribute to the playback information for each video clip (1152) associated with the first item, second item and third items, and affixes a second flag used to play back video clips (1152) associated with dependent items according to a second attribute other than the first attribute to the playback information for each video clip (1152) associated with a dependent item. The first attribute and the second attribute can be any attribute selected from among video clip (1152) playback time, video clip (1152) playback speed, an indicator denoting whether or not to play back the video clip (1152), and the size of the playback window for the video clip (1152).

The video creating means (1142) also determines whether or not there is an operation script associated with an identified item and/or dependent item, and dynamically creates a video (1153), when an operation script is present, according to virtual execution screens executed by the script using video clips (1152) associated with items by the operation script.

Also, the video creating means (1142) uses the video clip identifying table (1155) to select video clips (1122) associated with items and dependent items identified by the item identifying means (1141).

The video providing means (1143) in the server (1131) sends the video (1153) created by the video creating means (1142) or information on playing back the video (1153) (for example, information indicating the location where the video data is being stored such as a URL, URI or file name) to the user terminal (1161).

The video or video information receiving means (1173) in the user terminal (1161) receives the video (1153) or information on playing back the video that was sent by the video providing means (1143) in the server (1131).

The video playing means (1174) in the user terminal (1161) plays back the video (1153) while receiving the video (1153) from the video providing means (1143) in the server (1131), or stores the video (1153) sent by the video providing means (1143) in the server (1131) in a storage device (108, 128), and then plays back the video (1183) stored in the storage device (108, 128).

The video playing means (1174) may also receive information on playing back a video from the video providing means (1143) in the server (1131), download (1182) the video clip (1152) using the information, and play the video. Alternatively, it may receive information on playing back a video from the video providing means (1143) in the server (1131), retrieve video clips (1182, which are the same as video clips (1153) or copies) stored in the storage device (108, 128), and play the video.

Electronic manuals present operating instructions in text form similar to paper manuals, and as video (using, for example, animation of operating procedures). However, it takes time to play video, and it is a poor use of time to have to watch or skip through operations that the user has already learned.

It is an object of the present invention to provide an electronic device which allows a user to select one or more items in an electronic manual (such as the table of contents, a heading, a title or a step), dynamically selects the video clips associated with the items selected by the user and with items dependent on these items, and provides the video to the user.

It is an object of the present invention to provide an electronic device which allows a user to select one or more items in an electronic manual, dynamically selects the video clips associated with the items selected by the user and with items dependent on these items, and provides the video to the user.

The present invention is a method for dynamically creating video based on a structured document by associating video clips with items in a structured document. This method identifies at least one item in the structured document selected by a user, identifies at least one dependent item having a dependent relationship with the identified item, dynamically creates a video on the basis of at least one video clip associated with each identified item and at least one video clip associated with each identified dependent item, and provides the created video or information for playing back the created video to the user.

The present invention provides a technique for dynamically creating video based on a structured document. This technique may be incorporated into a method, computer system, electronic device program, or electronic device program product for dynamically creating video based on a structured document.

A first aspect of the present invention is a method for dynamically creating video based on a structured document by associating video clips with items in a structured document, the method executing in an electronic device the steps of:

identifying at least one item in the structured document selected by a user;

identifying at least one dependent item having a dependent relationship with the identified item;

dynamically creating a video on the basis of at least one video clip associated with each identified item, and at least one video clip associated with each identified dependent item; and providing the video or information for playing back the video to the user.

In an embodiment of the present invention, the at least one item in the structured document selected by the user may include the item at the start point and the item at the end point in the structured document indicated by the user.

In an embodiment of the present invention, the step of identifying the selected item may further comprise the steps of:

identifying at least one combination of an item at the selected start point (the "first item") and an item at the selected end point (the "second item"); and identifying each item ("third items") between the first item and the second item.

In an embodiment of the present invention, the step of identifying the selected item may further comprise the steps of:

determining whether or not there is a dependent item dependent on the first item, the second item, or any third item; and identifying the dependent item when the presence of a dependent item has been determined.

In an embodiment of the present invention, the step of dynamically creating the video may comprise the steps of:

sorting the first item, the second item and any third items in order; and dynamically creating a video in the order of the items on the basis of the video clips associated with each of the first item, second item and third items.

In an embodiment of the present invention, the step of dynamically creating the video may comprise the steps of:

sorting the first item, the second item, the third items and the dependent items in order;

and;

dynamically creating a video in the order of the items on the basis of the video clips associated with each of the first item, second item, third items and dependent items.

In an embodiment of the present invention, the step of dynamically creating the video may comprise the step of inserting between a video clip associated with a first item, a second item or a third item and a video clip associated with a dependent item directly adjacent to the first item, second item or third item a supplemental video clip explaining the video clip to be presented to the user next.

In an embodiment of the present invention, the step of dynamically creating the video may further comprise the steps of:

affixing a first flag used to play back according to a first attribute each video clip associated with the first item, second item and third items to the playback information for each video clip associated with the first item, second item and third items; and affixing a second flag used to play back according to a second attribute other than the first attribute each video clip associated with a dependent item to the playback information for each video clip associated with a dependent item.

In an embodiment of the present invention, the first attribute and the second attribute may be any attribute selected from among the video clip playback time, the video clip playback speed, an indicator denoting whether or not to play back the video clip, and the size of the playback window for the video clip.

In an embodiment of the present invention, the step of dynamically creating the video may further comprise the steps of:

determining whether or not there is an operation script associated with an identified item and/or dependent item; and dynamically creating a video, when an operation script is present, according to the virtual execution screens executed by the script using video clips associated with items by the operation script.

In an embodiment of the present invention, the structured document may have a tree structure, and each item may correspond to a node in the tree structure.

In an embodiment of the present invention, the electronic device may be a server able to receive from a user terminal an item selected by the user.

In an embodiment of the present invention, the step of providing video or video information to the user may further comprise the step of sending video information or information for playing back the video from the server to the user terminal when the electronic device is a server.

In an embodiment of the present invention, the step of identifying an item may further comprise the step of receiving the item selected by the user when the electronic device is a server.

In an embodiment of the present invention, the electronic device may be a user terminal including a structured document.

In an embodiment of the present invention, the step of providing video or video information to the user may further comprise the step of playing back the provided video or the step of playing back the video using the provided information when the electronic device is a user terminal.

In an embodiment of the present invention, the step of identifying an item may further comprise the step of identifying a selected item in response to the selection of at least one item in a structured document by the user when the electronic device is a user terminal.

A second aspect of the present invention is an electronic device for dynamically creating video based on a structured document by associating video clips with items in a structured document, the electronic device comprising:

an item identifying means for identifying at least one item in the structured document selected by a user, and at least one dependent item having a dependent relationship with the identified item;

a video creating means for dynamically creating a video on the basis of at least one video clip associated with each identified item, and at least one video clip associated with each identified dependent item; and a video providing means for providing the video or information for playing back the video to the user.

In an embodiment of the present invention, at least one item in the structured document selected by the user may include the item at the start point and the item at the end point in the structured document indicated by the user.

In an embodiment of the present invention, the item identifying means may:

identify at least one combination of an item at the selected start point (the "first item") and an item at the selected end point (the "second item"); and identify each item ("third items") between the first item and the second item.

In an embodiment of the present invention, the item identifying means may:

determine whether or not there is a dependent item dependent on the first item, the second item, or any third item; and identify the dependent item when the presence of a dependent item has been determined.

In an embodiment of the present invention, the video creating means may:

sort the first item, the second item and any third items in order; and dynamically create a video in the order of the items on the basis of the video clips associated with each of the first item, second item and third items.

In an embodiment of the present invention, the video creating means may:

sort the first item, the second item, the third items and the dependent items in order; and dynamically create a video in the order of the items on the basis of the video clips associated with each of the first item, second item, third items and dependent items.

In an embodiment of the present invention, the video creating means may insert between a video clip associated with a first item, a second item or a third item and a video clip associated with a dependent item directly adjacent to the first item, second item or third item a supplemental video clip explaining the video clip to be presented to the user next.

In an embodiment of the present invention, the video creating means may:

affix a first flag used to play back according to a first attribute each video clip associated with the first item, second item and third items to the playback information for each video clip associated with the first item, second item and third items; and affix a second flag used to play back according to a second attribute other than the first attribute each video clip associated with a dependent item to the playback information for each video clip associated with a dependent item.

In an embodiment of the present invention, the first attribute and the second attribute may each be any attribute selected from among the video clip playback time, the video clip playback speed, an indicator denoting whether or not to play back the video clip, and the size of the playback window for the video clip.

In an embodiment of the present invention, the video creating means may:

determine whether or not there is an operation script associated with an identified item and/or dependent item; and dynamically create a video, when an operation script is present, according to the virtual execution screens executed by the script using video clips associated with items by the operation script.

In an embodiment of the present invention, the structured document may have a tree structure, and each item may correspond to a node in the tree structure.

In an embodiment of the present invention, the electronic device may be a server able to receive from a user terminal an item selected by the user.

In an embodiment of the present invention, the video providing means may send video information or information for playing back the video from the server to the user terminal when the electronic device is a server.

In an embodiment of the present invention, the item identifying means may receive the item selected by the user when the electronic device is a server.

In an embodiment of the present invention, the electronic device may be a user terminal including a structured document.

In an embodiment of the present invention, the video creating means may play back the provided video or play back the video using the provided information when the electronic device is a user terminal.

In an embodiment of the present invention, the item identifying means may identify a selected item in response to the selection of at least one item in a structured document by the user when the electronic device is a user terminal.

A third aspect of the present invention is an electronic system for dynamically creating video based on a structured document by associating video clips with items in a structured document, the electronic system comprising:

a user terminal, and a server connected to the user terminal;

the user terminal sending to the server as a selected item at least one item in a structured document selected by the user; and the server
receiving the item sent by the user terminal,
identifying the item in the structured document selected by the user,
identifying at least one dependent item having a dependent relationship with the selected item,
dynamically creating a video on the basis of at least one video clip associated with each identified item and at least one video clip associated with each identified dependent item, and
sending the video or information for playing back the video to the user terminal.

In an embodiment of the present invention, at least one item in the structured document selected by the user may include the item at the start point and the item at the end point in the structured document indicated by the user.

In an embodiment of the present invention, the server may:

identify at least one combination of an item at the selected start point (the "first item") and an item at the selected end point (the "second item"); and identify each item ("third items") between the first item and the second item.

In an embodiment of the present invention, the server may:

determine whether or not there is a dependent item dependent on the first item, the second item, or any third item; and identify the dependent item when the presence of a dependent item has been determined.

In an embodiment of the present invention, the server may:

sort the first item, the second item and any third items in order; and dynamically create a video in the order of the items on the basis of the video clips associated with each of the first item, second item and third items.

In an embodiment of the present invention, the server may:

sort the first item, the second item, the third items and the dependent items in order; and dynamically create a video in the order of the items on the basis of the video clips associated with each of the first item, second item, third items and dependent items.

In an embodiment of the present invention, the server may insert between a video clip associated with a first item, a second item or a third item and a video clip associated with a dependent item directly adjacent to the first item, second item or third item a supplemental video clip explaining the video clip to be presented to the user next.

In an embodiment of the present invention, the server may:

affix a first flag used to play back according to a first attribute each video clip associated with the first item, second item and third items to the playback information for each video clip associated with the first item, second item and third items; and affix a second flag used to play back according to a second attribute other than the first attribute each video clip associated with a dependent item to the playback information for each video clip associated with a dependent item.

In an embodiment of the present invention, the first attribute and the second attribute may each be any attribute selected from among the video clip playback time, the video clip playback speed, an indicator denoting whether or not to play back the video clip, and the size of the playback window for the video clip.

In an embodiment of the present invention, the server may:

determine whether or not there is an operation script associated with an identified item and/or dependent item; and dynamically create a video, when an operation script is present, according to the virtual execution screens executed by the script using video clips associated with items by the operation script.

In an embodiment of the present invention, the structured document may have a tree structure, and each item may correspond to a node in the tree structure.

In an embodiment of the present invention, the server may send video information or information for playing back the video to the user terminal.

In an embodiment of the present invention, the server may receive the item selected by the user.

In an embodiment of the present invention, the user terminal may identify a selected item in response to the selection of at least one item in a structured document by the user.

In an embodiment of the present invention, the user terminal may play back the video provided by the server or play back the video using the information provided by the server.

In a fourth aspect of the present invention, an electronic device program or electronic device program product for dynamically creating video on the basis of a structured document executes in an electronic device each step of the method. When the electronic device is a server, the electronic device program may be a program for a server. When the electronic device is a user terminal, the electronic device program may be a program for a user terminal.

The electronic device program according to the present embodiment can be stored on any computer-readable recording medium, including a flexible disk, MO, CD-ROM, DVD, BD, hard disk device, USB memory, ROM, MRAM or RAM. The electronic device program can also be downloaded from another data processing system connected to a communication network for storage on a recording medium, or can be copied from another recording medium. The program can also be compressed, divided into a plurality of programs, and recorded on one or more recording media. An electronic device program product embodying the present invention can take a variety of forms. The electronic device program product can include, for example, the recording medium on which the electronic device program is stored or a transmission medium over which the electronic device program is transmitted.

The summary of the present invention provided above is not intended to enumerate all of the required features of the present invention, and it is to be understood that the present invention includes all combinations and sub-combinations of these constituent elements.

It should also be clear that a person skilled in the art could conceive of various changes such as combining a plurality of machines and allocating functions to these machines to embody the hardware configurational elements of the information processing device used in an embodiment of the present invention. These changes are encompassed within the concept of the present invention. However, these configurational elements are for illustrative purposes only, and all of the configurational elements are not essential configurational elements of the present invention.

Also, the present invention can be realized by hardware, software, or a combination of hardware and software. When the present invention is executed by a combination of hardware and software, it is typically executed by a device in which the electronic device program has been installed. Here, the electronic device program is downloaded to the memory of the device and executed. The electronic device program then controls the device and executes the processing of the present invention. This electronic device program can be configured from groups of instructions expressed in any language, code or notation. The device can execute the specific functions in the group of instructions immediately, or after (1) converting the group of instructions into another language, code or notation, and/or (2) copying the group of instructions to another medium.

The technique according to an embodiment of the present invention enables one or more specific items to be selected from an electronic manual by the user. The user can then select a video clip associated with dependent items that have a dependent relationship with the user-selected item in addition to a video clip associated with the user-selected item. The selected video clips are then consolidated to dynamically create a video, and the dynamically created video can be provided to the user. As a result, the user can selectively view video clips related to an item to be learned or viewed by the user or to an item in which the user is interested along with video clips associated with dependent items having a dependent relationship with the item. In other words, the technique according to an embodiment of the present invention dynamically creates video including not only video clips related to an item to be learned or viewed by the user or to an item in which the user is interested but also video clips associated with dependent items having a dependent relationship with the item. The technique according to an embodiment of the present invention enables video to be viewed on demand that includes both video clips related to an item to be learned or viewed by the user or to an item in which the user is interested along with video clips associated with dependent items having a dependent relationship with the item to be learned or viewed by the user or with the item in which the user is interested.

Because the technique according to an embodiment of the present invention enables the user to indicate different ways that the video related to a dependent item can be played back in the dynamically created video, the technique can reduce the impression on the user that the video related to the dependent item has caused the user to have to view extra video.

The technique according to an embodiment of the present invention can dynamically execute an operation to be performed by the user (for example, a mouse operation, keyboard operation or input operation) in a simulated manner to show the user how to perform the operation by using video clips of video data obtained by executing an operation script on the user terminal instead of a prerecorded video script.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program code embodied therewith, wherein the computer readable storage medium is not a transitory signal per se, and wherein the program code is executable by a processor to cause the processor to perform a method comprising:
   selecting, based on user input to an interface displaying an online manual for a software application, a plurality of items comprising an initial item, an end item, and an intervening item in a table of contents pane;
   compiling the plurality of items in a step identifier (ID) list in an order of the initial item, the intervening item, and the end item;
   identifying a dependent item associated with the initial item by querying a dependent item identifying table;
   inserting the dependent item in the step ID list prior to the initial item;
   identifying a plurality of video clips associated with each of the initial item, the intervening item, the end item, the dependent item, and items adjacent to the initial item and the end item using a video clip identifying table, wherein the video clip identifying table includes, for respective items in the online manual, a respective Universal Resource Locator (URL) to a corresponding video clip;
   ordering the plurality of video clips according to the step ID list;
   categorizing the plurality of video clips, wherein video clips corresponding to the initial item, the intervening item, and the end item are categorized as main steps, wherein video clips associated with the dependent item are categorized as supplemental steps, and wherein video clips associated with items adjacent to the initial item and the end item are categorized as transitional steps; and
   creating an instructional video corresponding to the plurality of items selected from the online manual for the software application, wherein the instructional video displays:
      a first transitional video clip associated with items adjacent to the initial item;
      a first supplemental video clip associated with the dependent item;
      a main video clip associated with the initial item, the intervening item, and the end item; and
      a second transitional video clip associated with items adjacent to the end item.

2. The computer program product of claim 1, wherein the dependent item identifying table comprises task identifiers, step identifiers, and dependency identifiers.

3. The computer program product of claim 1, wherein the method further comprises:
   displaying the instructional video on the interface, wherein the displaying includes:
      a window with a continue button and a skip button; and
      a slider for controlling the playback spot in the instructional video.

4. A method comprising:
   selecting, based on user input to an interface displaying an online manual for a software application, a plurality of items comprising an initial item, an end item, and an intervening item in a table of contents pane;
   compiling the plurality of items in a step identifier (ID) list in an order of the initial item, the intervening item, and the end item;
   identifying a dependent item associated with the initial item by querying a dependent item identifying table;
   inserting the dependent item in the step ID list prior to the initial item;
   identifying a plurality of video clips associated with each of the initial item, the intervening item, the end item, the dependent item, and items adjacent to the initial item and the end item using a video clip identifying table, wherein the video clip identifying table includes, for respective items in the online manual, a respective Universal Resource Locator (URL) to a corresponding video clip;
   ordering the plurality of video clips according to the step ID list;
   categorizing the plurality of video clips, wherein video clips corresponding to the initial item, the intervening item, and the end item are categorized as main steps, wherein video clips associated with the dependent item are categorized as supplemental steps, and wherein video clips associated with items adjacent to the initial item and the end item are categorized as transitional steps; and creating an instructional video corresponding to the plurality of items selected from the online manual for the software application, wherein the instructional video displays:
- a first transitional video clip associated with items adjacent to the initial item;
- a first supplemental video clip associated with the dependent item;
- a main video clip associated with the initial item, the intervening item, and the end item; and
- a second transitional video clip associated with items adjacent to the end item.

5. The method of claim 4, wherein the dependent item identifying table comprises task identifiers, step identifiers, and dependency identifiers.

6. The method of claim 4, wherein the method further comprises:
displaying the instructional video on the interface, wherein the displaying includes:
- a window with a continue button and a skip button; and
- a slider for controlling the playback spot in the instructional video.

7. A system comprising:
a processor; and
a computer-readable storage medium storing program code, wherein the computer-readable storage medium is not a transitory signal per se, and wherein the program code, when executed by the processor, is configured to cause the processor to perform a method comprising:
selecting, based on user input to an interface displaying an online manual for a software application, a plurality of items comprising an initial item, an end item, and an intervening item in a table of contents pane;
compiling the plurality of items in a step identifier (ID) list in an order of the initial item, the intervening item, and the end item;
identifying a dependent item associated with the initial item by querying a dependent item identifying table;
inserting the dependent item in the step ID list prior to the initial item;
identifying a plurality of video clips associated with each of the initial item, the intervening item, the end item, the dependent item, and items adjacent to the initial item and the end item using a video clip identifying table, wherein the video clip identifying table includes, for respective items in the online manual, a respective Universal Resource Locator (URL) to a corresponding video clip;
ordering the plurality of video clips according to the step ID list;
categorizing the plurality of video clips, wherein video clips corresponding to the initial item, the intervening item, and the end item are categorized as main steps, wherein video clips associated with the dependent item are categorized as supplemental steps, and wherein video clips associated with items adjacent to the initial item and the end item are categorized as transitional steps; and
creating an instructional video corresponding to the plurality of items selected from the online manual for the software application, wherein the instructional video displays:
- a first transitional video clip associated with items adjacent to the initial item;
- a first supplemental video clip associated with the dependent item;
- a main video clip associated with the initial item, the intervening item, and the end item; and
- a second transitional video clip associated with items adjacent to the end item.

8. The system of claim 7, wherein the dependent item identifying table comprises task identifiers, step identifiers, and dependency identifiers.

9. The system of claim 7, wherein the method further comprises:
displaying the instructional video on the interface, wherein the displaying includes:
- a window with a continue button and a skip button; and
- a slider for controlling the playback spot in the instructional video.

* * * * *